US010268291B2

United States Patent
(12) United States Patent
Ogawa et al.

(10) Patent No.: US 10,268,291 B2

(45) Date of Patent: Apr. 23, 2019

(54) INFORMATION PROCESSING DEVICE, INFORMATION PROCESSING METHOD, PROGRAM, AND INFORMATION STORAGE MEDIUM

(71) Applicant: Sony Computer Entertainment Inc., Tokyo (JP)

(72) Inventors: Tomohiro Ogawa, Kanagawa (JP); Takashi Hatakeda, Tokyo (JP); Yuichi Ando, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 58 days.

(21) Appl. No.: 14/422,080

(22) PCT Filed: Aug. 23, 2013

(86) PCT No.: PCT/JP2013/072525

§ 371 (c)(1),
(2) Date: Feb. 17, 2015

(87) PCT Pub. No.: WO2014/034549

PCT Pub. Date: Mar. 6, 2014

(65) Prior Publication Data

US 2015/0227246 A1 Aug. 13, 2015

(30) Foreign Application Priority Data

Aug. 27, 2012 (JP) ................................ 2012-187035
Aug. 27, 2012 (JP) ................................ 2012-187036

(51) Int. Cl.

*G06F 3/041* (2006.01)
*G06F 3/02* (2006.01)

(Continued)

(52) U.S. Cl.

CPC .......... *G06F 3/0412* (2013.01); *G06F 3/0219* (2013.01); *G06F 3/0227* (2013.01);

(Continued)

(58) Field of Classification Search

CPC ...... G06F 3/0412; G06F 3/038; G06F 3/0219; G06F 3/0227; G06F 3/0414; G06F 3/044;

(Continued)

(56) References Cited

U.S. PATENT DOCUMENTS 8,560,947 B2 10/2013 Gillespie
8,581,868 B2 11/2013 Satokata (Continued)

FOREIGN PATENT DOCUMENTS

CN 101431566 A 5/2009
CN 102591417 A 7/2012

(Continued)

OTHER PUBLICATIONS

Office Action for corresponding JP Application No. 2012-187035, dated Aug. 11, 2015.

(Continued)

*Primary Examiner* — Amare Mengistu
*Assistant Examiner* — Jennifer L Zubajlo
(74) *Attorney, Agent, or Firm* — Matthew B. Dernier, Esq.

(57) ABSTRACT

To make it possible to exclusively treat an operating input to a touch sensor or an operating input to an operating key different from the touch center as an operating input serving as a basis for the performance of processing. A processing executing section performs processing according to an operating input to a touch sensor or an operating input to an operating section. When the operating inputs to both of the touch sensor and the operating section are received, the (Continued)

processing executing section performs only processing according to one of the operating inputs.

6 Claims, 14 Drawing Sheets

(51) Int. Cl.
*G06F 3/044* (2006.01)
*G06F 3/038* (2013.01)
*G06F 3/0488* (2013.01)
*G06F 3/0484* (2013.01)

(52) U.S. Cl.
CPC .............. *G06F 3/038* (2013.01); *G06F 3/044* (2013.01); *G06F 3/0414* (2013.01); *G06F 3/0416* (2013.01); *G06F 3/0488* (2013.01); *G06F 3/04842* (2013.01); *G06F 2203/04101* (2013.01); *G06F 2203/04105* (2013.01); *G06F 2203/04106* (2013.01)

(58) Field of Classification Search
CPC .. G06F 3/0488; G06F 3/0416; G06F 3/04842; G06F 2203/04101; G06F 2203/04105; G06F 2203/04106
See application file for complete search history.

(56) References Cited

U.S. PATENT DOCUMENTS

2005/0184973 A1* 8/2005 Lum ....................... G06F 3/038 345/173
2008/0174565 A1* 7/2008 Chang ................ G06F 3/03547 345/173
2010/0156675 A1* 6/2010 Ganey .................... G06F 3/038 341/20
2010/0214250 A1 8/2010 Gillespie
2010/0275163 A1 10/2010 Gillespie
2011/0012836 A1 1/2011 Zhang
2011/0221683 A1 9/2011 Satokata
2012/0105481 A1* 5/2012 Baek .................. G06F 3/04886 345/652
2013/0069883 A1 3/2013 Oga
2014/0055370 A1* 2/2014 Fujii .................... G06F 3/0219 345/173
2015/0370429 A1 12/2015 Nezu

FOREIGN PATENT DOCUMENTS

| | | | | |
|---|---|---|---|---|
| JP | 2004295727 | A | | 10/2004 |
| JP | 2004532477 | A | | 10/2004 |
| JP | 2005096596 | A | | 4/2005 |
| JP | 2005332190 | A | | 12/2005 |
| JP | 2008052586 | A | * | 3/2008 |
| JP | 2008052586 | A | * | 3/2008 |
| JP | 2009245037 | A | | 10/2009 |
| JP | 2011138218 | A | * | 7/2011 |
| JP | 2011138218 | A | * | 7/2011 |
| WO | 02093542 | A1 | | 11/2002 |
| WO | 2010050431 | A1 | | 5/2010 |
| WO | 2011145304 | A1 | | 11/2011 |

OTHER PUBLICATIONS

Miki Takano, “Feature 2, Use Vista in lightness!,” 19 Nikkei PC21, Japan, Nikkei Business Publications, Inc., vol. 14, No. 15, 5 pages, see p. 68, Aug. 1, 2009, (for relevancy see p. 6, Reason 3 of the JP-OA for corresponding JP Application No. 2012-187035, dated Aug. 11, 2015 cited above).

Decision to Grant for corresponding JP Application No. 2012-187036, dated Jul. 7, 2015.

International Preliminary Report on Patentability and Written Opinion for corresponding PCT Application No. PCT/JP2013/072525, dated Mar. 12, 2015.

International Search Report for corresponding PCT Application No. PCT/JP2013/072525, dated Nov. 26, 2013.

Office Action for a corresponding JP Application No. 2015-154829, 7 pages, dated Jun. 14, 2016.

Office Action for corresponding CN Application No. 201380044116.9, 12 pages, dated Oct. 9, 2016.

* cited by examiner

CONTROL SECTION
20
STORAGE SECTION
22
COMMUNICATING SECTION
24
IMAGE PROCESSING SECTION
26
DISPLAY SECTION
28
FRONT TOUCH SENSOR
30a
REAR TOUCH SENSOR
30b
30
34
OPERATING KEYS
32
10

DATE AND TIME SETTING
TIME ZONE
DATE DISPLAY
TIME DISPLAY
DAYLIGHT SAVING TIME

GMT +06:00
GMT +07:00
GMT +08:00
✓ GMT +09:00
GMT +09:30
GMT +10:00
GMT +12:00

102

INFORMATION PROCESSING DEVICE, INFORMATION PROCESSING METHOD, PROGRAM, AND INFORMATION STORAGE MEDIUM

TECHNICAL FIELD

The present invention relates to an information processing device, an information processing method, a program, and an information storage medium.

BACKGROUND ART

There have recently been an increasing number of information processing devices including a touch panel as an operating input device together with operating parts such as buttons, direction keys, analog sticks, and the like (hereinafter referred to as operating keys). Such an information processing device performs for example processing according to an operating input to an operating key and processing according to a position on a touch sensor which position is touched by an object such as a finger, a stylus, or the like.

In addition, such an information processing device for example displays a plurality of options on the touch sensor, and performs processing according to an option selected by a user from among the plurality of options.

Then, such information processing devices include an information processing device that allows a user to select an option by operating an operating key and an information processing device that allows a user to select an option by operating a touch sensor.

An information processing device that allows an option to be selected by operating an operating key first displays a plurality of options on a display section and highlights one of the plurality of options as an option being selected. Then, the information processing device thereafter receives an operation for changing the option being selected from the user, and changes the highlighted option in response to the reception of the operation. Then, when receiving an option determining operation from the user while an option corresponding to desired processing is highlighted, the information processing device performs processing according to the highlighted option.

On the other hand, an information processing device that allows an option to be selected by operating a touch sensor first displays a plurality of options on a display section. Then, when the information processing device thereafter receives a tap operation of tapping the touch sensor with a finger or the like from the user, the information processing device performs processing according to an option displayed at a tapped position (a detected position on the touch sensor).

SUMMARY

Technical Problems

Operating inputs to the touch sensor include for example a tap operation of tapping the touch sensor with a finger or the like, a double tap operation of tapping the touch sensor with a finger or the like twice consecutively, a dragging operation of shifting a finger or the like in a state in which the finger or the like is in contact with the touch sensor, a flick operation of sweeping a finger or the like in a state in which the finger or the like is in contact with the touch sensor, and a pinch operation of pinching with two fingers or the like in a state in which the fingers or the like is contact with the touch sensor. On the other hand, operating inputs to operating keys different from the touch sensor include the depression of a button, the tilting of an analog stick, the sliding of a slide switch, and the like.

Thus, a system of operating input to the touch sensor greatly differs from a system of operating input to the operating keys different from the touch sensor. It is therefore considered that the user of the information processing device typically uses either the touch sensor or the operating keys different from the touch sensor as a device for operating input serving as a basis for processing to be performed by the information processing device.

In this case, when both of operating input by the touch sensor and operating input by the operating keys different from the touch sensor are treated as operating input serving as a basis for the performance of processing, the information processing device may perform processing not expected by the user.

In addition, when none of options is highlighted in a situation where the user who has performed an operation of selecting an option by the touch sensor makes a transition to an operation of selecting an option by an operating key, one of the options needs to be highlighted.

In this case, it is considered that the user can make a smooth transition from the operation of selecting an option by the touch sensor to the operation of selecting an option by an operating key when an option identified on the basis of a history of operations hitherto performed on the touch sensor is highlighted. However, it cannot be said that in the conventional information processing device, sufficient consideration has been given to a smooth transition from the operation of selecting an option by the touch sensor to the operation of selecting an option by an operating key.

The present invention has been made in view of the above problems. It is an object of the present invention to make it possible to exclusively treat an operating input to a touch sensor or an operating input to an operating key different from the touch center as an operating input serving as a basis for the performance of processing.

In addition, it is another object of the present invention to enable a user to make a smooth transition from an operation of selecting an option by a touch sensor to an operation of selecting an option by an operating key.

Solution to Problems

In order to solve the above problems, according to the present invention, there is provided an information processing device including: a touch sensor; an operating section different from the touch sensor; and a processing executing section performing processing according to an operating input to the touch sensor or an operating input to the operating section, wherein when the operating inputs to both of the touch sensor and the operating section are received, the processing executing section performs only processing according to one of the operating inputs.

In addition, according to the present invention, there is provided an information processing method including: a first receiving step of receiving an operating input to a touch sensor; a second receiving step of receiving an operating input to an operating section different from the touch sensor; and a processing performing step of performing processing according to the operating input to the touch sensor or the operating input to the operating section, wherein in the processing performing step, when the operating inputs to both of the touch sensor and the operating section are received, only processing according to one of the operating inputs is performed.

In addition, according to the present invention, there is provided a program making a computer function as: a receiving section receiving operating inputs to a touch sensor and an operating section different from the touch sensor; and a processing executing section performing processing according to the operating input to the touch sensor or the operating input to the operating section, wherein when the operating inputs to both of the touch sensor and the operating section are received, the processing executing section performs only processing according to one of the operating inputs.

In addition, according to the present invention, there is provided a computer readable information storage medium storing a program making a computer function as: a receiving section receiving operating inputs to a touch sensor and an operating section different from the touch sensor; and a processing executing section performing processing according to the operating input to the touch sensor or the operating input to the operating section, wherein when the operating inputs to both of the touch sensor and the operating section are received, the processing executing section performs only processing according to one of the operating inputs.

In one mode of the present invention, when the operating input to another of the touch sensor or the operating section is received while processing according to the operating input to one of the touch sensor or the operating section is performed, the processing executing section stops the processing according to the operating input to the one, and starts to perform processing according to the operating input to the other.

In addition, in one mode of the present invention, when another operating input to the one is received while the processing according to the operating input to the other is performed, the processing executing section stops the processing according to the operating input to the other, and starts to perform processing according to the other operating input to the one.

In addition, in one mode of the present invention, in a case where the operating input to the one, the operating input to the one having been performed since before the operating input to the other, is continued when another operating input to the one is received while the processing according to the operating input to the other is performed, the processing executing section continues the processing according to the operating input to the other.

In addition, in one mode of the present invention, when the operating input to the operating section is received, the processing executing section performs processing according to an operating input to the touch sensor, the operating input to the touch sensor being identified as an operating input associated with the operating input to the operating section, on a basis of data associating the operating input to the operating section with the operating input to the touch sensor.

In addition, according to the present invention, there is provided another information processing device including: a touch sensor; an operating section different from the touch sensor; and a processing executing section performing processing, wherein in a case where an operating input to the operating section associated with highlighting is received when options are displayed on a display section and there is no highlighted option, the processing executing section highlights an option disposed at a position identified on a basis of a history of detection of positions on the touch sensor, and in a case where an operating input to the operating section associated with performance of processing according to the highlighted option is received when the highlighted option is present, the processing executing section performs the processing according to the highlighted option.

In addition, according to the present invention, there is provided yet another information processing device including: a touch panel; an operating section different from the touch panel; and a processing executing section performing processing, wherein in a case where an operating input to the operating section associated with highlighting is received when options are displayed on the touch panel and there is no highlighted option, the processing executing section highlights an option disposed at a position identified on a basis of a history of detection of positions on the touch panel, and in a case where an operating input to the operating section associated with performance of processing according to the highlighted option is received when the highlighted option is present, the processing executing section performs the processing according to the highlighted option.

In addition, according to the present invention, there is provided another information processing method including: a first receiving step of receiving an operating input to a touch sensor; a second receiving step of receiving an operating input to an operating section different from the touch sensor; a display control step of, in a case where an operating input to the operating section associated with highlighting is received when options are displayed on a display section and there is no highlighted option, highlighting an option disposed at a position identified on a basis of a history of detection of positions on the touch sensor; and a processing performing step of, in a case where an operating input to the operating section associated with performance of processing according to the highlighted option is received when the highlighted option is present, performing the processing according to the highlighted option.

In addition, according to the present invention, there is provided another program making a computer function as: a receiving section receiving operating inputs to a touch sensor and an operating section different from the touch sensor; and a processing executing section performing processing, wherein in a case where an operating input to the operating section associated with highlighting is received when options are displayed on a display section and there is no highlighted option, the processing executing section highlights an option disposed at a position identified on a basis of a history of detection of positions on the touch sensor, and in a case where an operating input to the operating section associated with performance of processing according to the highlighted option is received when the highlighted option is present, the processing executing section performs the processing according to the highlighted option.

In addition, according to the present invention, there is provided another computer readable information storage medium storing a program making a computer function as: a receiving section receiving operating inputs to a touch sensor and an operating section different from the touch sensor; and a processing executing section performing processing, wherein in a case where an operating input to the operating section associated with highlighting is received when options are displayed on a display section and there is no highlighted option, the processing executing section highlights an option disposed at a position identified on a basis of a history of detection of positions on the touch sensor, and in a case where an operating input to the operating section associated with performance of processing according to the highlighted option is received when the highlighted option is present, the processing executing section performs the processing according to the highlighted option.

In one mode of the present invention, the processing executing section highlights an option disposed at a position closest from a position on the display section, the position on the display section being associated with a detected position on the touch sensor immediately before a point in time that the operating input to the operating section is received.

In addition, in one mode of the present invention, a plurality of operating sections are included, the plurality of operating sections being for mutually different pieces of processing to be performed according to an operating input when the highlighted option is present, and in a case where an operating input to one of the plurality of operating sections is received when the options are displayed on the display section and there is no highlighted option, the processing executing section highlights an option disposed at a position closest from a position on the display section, the position on the display section being associated with a detected position on the touch sensor immediately before a point in time that the operating input is received, irrespective of to which operating section the received operating input is.

In addition, in one mode of the present invention, in a case where an operating input to the operating section associated with display of a highlighting image is received when the options are displayed on the display section and no highlighting image highlighting an option is displayed, the processing executing section displays, on the display section, the highlighting image highlighting the option disposed at the position identified on the basis of the history of detection of positions on the touch sensor, and in a case where an operating input to the operating section associated with performance of processing according to the option highlighted by the highlighting image is received when the highlighting image is displayed on the display section, the processing executing section performs the processing according to the option highlighted by the highlighting image.

In addition, in one mode of the present invention, in a case where a predetermined time has passed since reception of a last operating input to the operating section when the highlighting image is displayed on the display section, the processing executing section performs control so as not to display the highlighting image on the display section while maintaining a state of the option to be highlighted by the highlighting image being displayed on the display section.

In addition, in one mode of the present invention, in a case where an operating input to the operating section associated with movement of the highlighting image is received when a plurality of options including an option allowing processing according to the option to be performed and an option not allowing processing according to the option to be performed and the highlighting image highlighting one of the options are displayed on the display section, the processing executing section changes a display position of the highlighting image such that the highlighting image is displayed in a position in which to highlight another option, and the display position of the highlighting image can be changed to either of a position in which to highlight the option allowing the processing according to the option to be performed and a position in which to highlight the option not allowing the processing according to the option to be performed.

In addition, in one mode of the present invention, when changing from a state of the highlighting image not being displayed on the display section to a state of the highlighting image being displayed on the display section, the processing executing section changes from a state of the highlighting image being disposed in a region larger than an option corresponding region associated with the option, a part of the region larger than the option corresponding region occupying the option corresponding region, to a state of the highlighting image being disposed on the option corresponding region.

In addition, in one mode of the present invention, when changing from a state of the highlighting image not being displayed on the display section to a state of the highlighting image being displayed on the display section, the processing executing section changes from a state of the highlighting image being disposed in a region smaller than an option corresponding region associated with the option, the region smaller than the option corresponding region occupying a part of the option corresponding region, through a state of the highlighting image being disposed in a region larger than the option corresponding region, a part of the region larger than the option corresponding region occupying the option corresponding region, to a state of the highlighting image being disposed on the option corresponding region.

DESCRIPTION OF EMBODIMENT

An embodiment of the present invention will hereinafter be described in detail with reference to the drawings.

[Hardware Configuration]

Figure 1A:
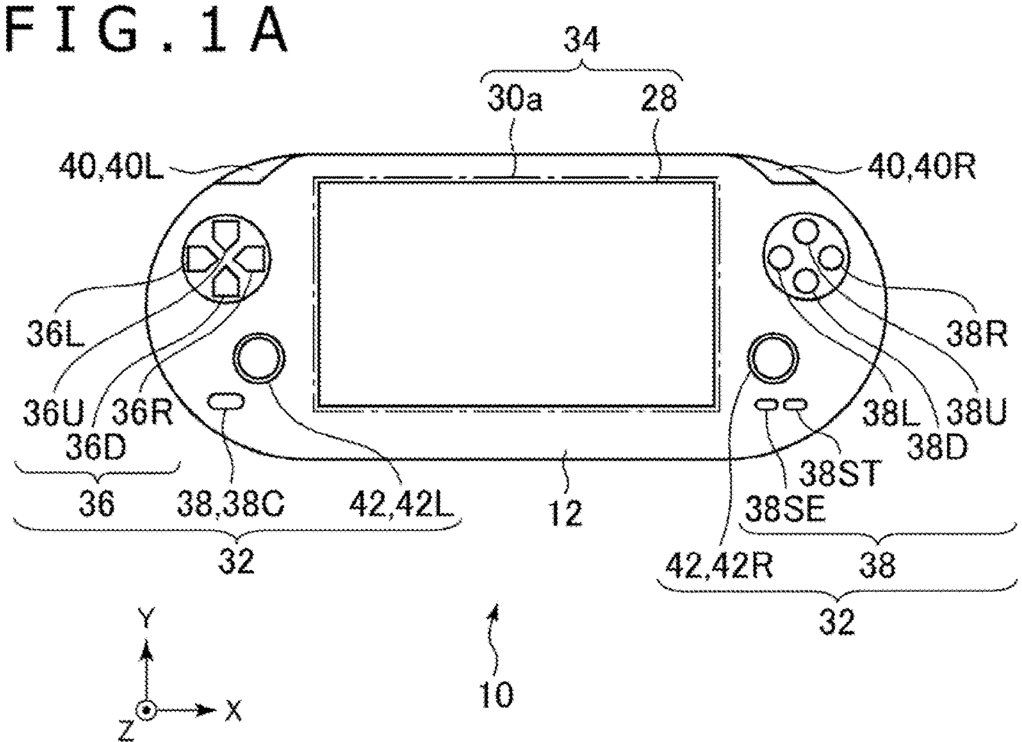
FIG. 1A is a front view of an external appearance of an information processing device according to one embodiment of the present invention.
Figure 1B:
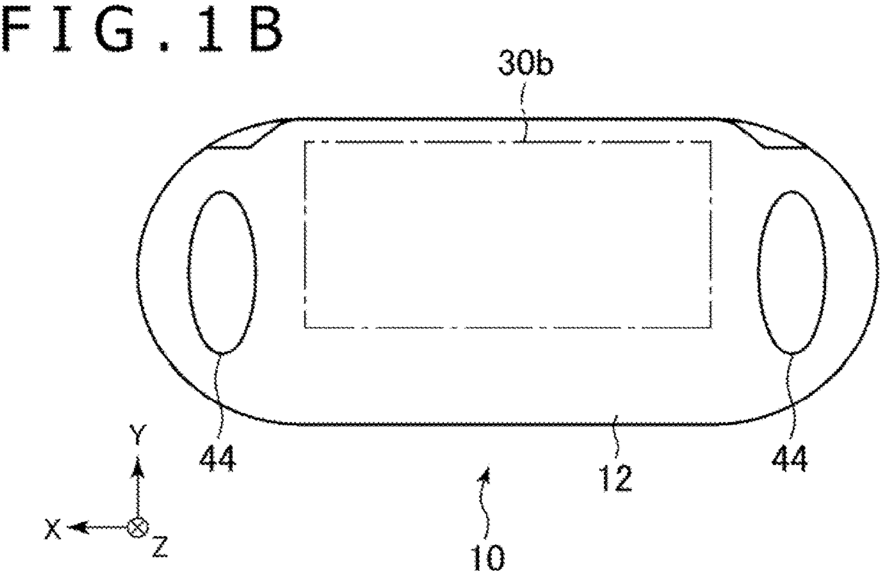
FIG. 1B is a rear view of the external appearance of the information processing device according to one embodiment of the present invention.
Figure 2:
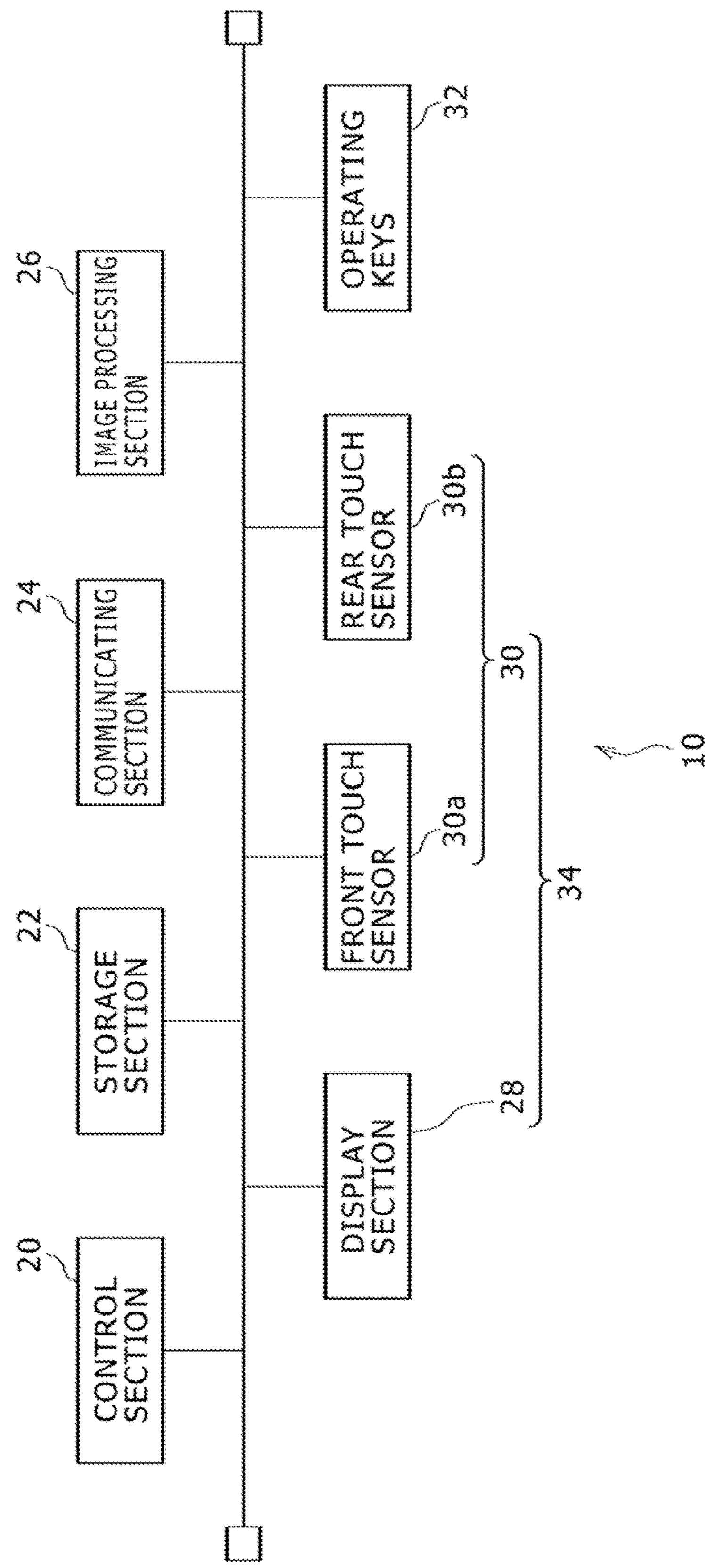
FIG. 2 is a block diagram showing an example of hardware configuration of the information processing device according to one embodiment of the present invention.

FIG. 1A is a front view of an external appearance of an information processing device 10 according to one embodiment of the present invention. FIG. 1B is a rear view of the external appearance of the information processing device 10 according to one embodiment of the present invention. FIG. 2 is a block diagram showing an example of hardware configuration of the information processing device 10 shown in FIG. 1A and FIG. 1B. Suppose that the information processing device 10 according to the present embodiment is for example a portable type device such as a portable type game machine or the like.

A casing 12 of the information processing device 10 according to the present embodiment has a flat shape as a whole. In the following, a horizontal direction (direction of width) of the casing 12 will be set as an X-axis direction, a vertical direction (direction of height) of the casing 12 will be set as a Y-axis direction, and a direction of thickness (direction of depth) of the casing 12 will be set as a Z-axis direction. In addition, in the present embodiment, a direction of going from a left to a right as viewed from the front surface of the casing 12 is an X-axis positive direction, a direction of going from a bottom to a top as viewed from the front surface of the casing 12 is a Y-axis positive direction, and a direction of going from the rear surface to the front surface of the casing 12 is a Z-axis positive direction. As shown in FIG. 1A, FIG. 1B, and FIG. 2, the information processing device 10 according to the present embodiment includes a control section 20, a storage section 22, a communicating section 24, an image processing section 26, a display section 28, touch sensors 30 (a front touch sensor 30*a* and a rear touch sensor 30*b* in the present embodiment), operating keys 32, and the like. These elements are connected to each other via a bus.

The control section 20 is for example a CPU or the like. The control section 20 performs various kinds of information processing according to a program stored in the storage section 22. The storage section 22 is for example memory elements such as a RAM, a ROM, and the like. The storage section 22 stores the program executed by the control section 20 and various kinds of data. The storage section 22 also functions as a work memory for the control section 20. The communicating section 24 is for example a network interface and the like (specifically a wireless LAN module, for example). The communicating section 24 transmits information to another information processing device 10, a server (not shown) on the Internet, and the like according to an instruction input from the control section 20. The communicating section 24 also outputs received information to the control section 20.

The image processing section 26 includes for example a GPU and a frame buffer memory. The image processing section 26 renders an image to be displayed on the display section 28 according to an instruction output by the control section 20. As a concrete example, the image processing section 26 includes a frame buffer memory corresponding to the display region of the display section 28, and the GPU writes the image to the frame buffer memory at predetermined time intervals according to the instruction from the control section 20. Then, the image written in the frame buffer memory is converted into a video signal in predetermined timing to be displayed on the display section 28.

The display section 28 according to the present embodiment is for example various kinds of image display devices such as a liquid crystal display panel, an organic EL display panel, and the like. The touch sensor 30 according to the present embodiment is a sensor that sequentially detects the contact of an object (for example a finger or the like) on a detecting surface at predetermined time intervals. The information processing device 10 according to the present embodiment includes two touch sensors 30 (the front touch sensor 30*a* and the rear touch sensor 30*b*).

The front surface of the casing 12 of the information processing device 10 according to the present embodiment is provided with a touch panel 34 in which the display section 28 and the front touch sensor 30*a* are integral with each other. In addition, the touch panel 34 according to the present embodiment has a substantially rectangular shape. The front touch sensor 30*a* is disposed so as to be superposed on the display section 28. The front touch sensor 30*a* has a substantially rectangular detecting surface having a shape and a size corresponding to those of the display surface of the display section 28. Then, in the present embodiment, when the front touch sensor 30*a* detects the contact of an object, the front touch sensor 30*a* detects the contact position of the object as a detected position. Incidentally, the front touch sensor 30*a* does not necessarily detect the position of an object only when the object comes into contact with the detecting surface, but the front touch sensor 30*a* may detect the position of the object with respect to the detecting surface when the object is brought into proximity into a detectable range on the detecting surface. The front touch sensor 30*a* according to the present embodiment is also a sensor capable of detecting the area (contact area) of a part of the object which part is in contact with the detecting surface.

The rear touch sensor 30*b* is disposed on the rear surface side of the casing 12 so as to be opposed to the front touch sensor 30*a*. In addition, in the present embodiment, as viewed from the front of the casing 12, the rear touch sensor 30*b* is disposed such that the left half of the rear touch sensor 30*b* is opposed to the left half of the front touch sensor 30*a* and the right half of the rear touch sensor 30*b* is opposed to the right half of the front touch sensor 30*a*. The rear touch sensor 30*b* according to the present embodiment has a substantially rectangular detecting surface whose length in the X-axis direction is substantially the same as that of the front touch sensor 30*a* and whose length in the Y-axis direction is shorter than that of the front touch sensor 30*a*. As with the front touch sensor 30*a*, the rear touch sensor 30*b* detects the position of an object on the detecting surface at predetermined time intervals. That is, the display surface of the display section 28, the detecting surface of the front touch sensor 30*a*, and the detecting surface of the rear touch sensor 30*b* are each arranged in a direction parallel to the XY plane of the casing 12, and are arranged linearly along the direction of thickness (Z-axis direction) of the casing 12. In addition, as with the front touch sensor 30*a*, the rear touch sensor 30*b* according to the present embodiment is a sensor capable of detecting the area (contact area) of a part of the object which part is in contact with the detecting surface.

The front touch sensor 30*a* and the rear touch sensor 30*b* according to the present embodiment may be of any type such for example as a capacitance type, a pressure sensitive type, or an optical type, as long as the front touch sensor 30*a* and the rear touch sensor 30*b* are a device capable of detecting the position of an object on the detecting surface. Incidentally, suppose in the present embodiment that both of the front touch sensor 30*a* and the rear touch sensor 30*b* are a multiple-point detection type touch sensor capable of detecting the contact of objects at a plurality of positions (for example a maximum of eight positions). In addition, the front touch sensor 30*a* and the rear touch sensor 30*b* according to the present embodiment may be a sensor capable of detecting the strength (pressure) of an object pressing the detecting surface.

Suppose in the present embodiment that a position at which information is displayed within the display section 28, a position at which an object is detected within the front touch sensor 30*a*, and a position at which an object is detected within the rear touch sensor 30*b* are expressed by a combination of an X-coordinate value and a Y-coordinate value in a same coordinate system. That is, a position within the front touch sensor 30*a* and a position within the display section 28 which position coincides with the position within the front touch sensor 30*a* are expressed by a same combination of an X-coordinate value and a Y-coordinate value. In addition, a position within the rear touch sensor 30*b* and a position formed by projecting the position within the rear touch sensor 30*b* onto the display surface of the display section 28 along the Z-axis direction are expressed by a same combination of an X-coordinate value and a Y-coordinate value. Thus, in the present embodiment, positions in the front touch sensor 30*a*, positions in the rear touch sensor 30*b*, and positions in the display section 28 are associated with each other.

Incidentally, suppose in the following description that the user performs an operating input by making a finger of the user or the like in contact with the front touch sensor 30*a* or the rear touch sensor 30*b*. However, without limitation to this, the user may perform an operating input by making an object such as a stylus or the like held by a hand in contact with the detecting surface.

The operating keys 32 are for example a kind of operating section used for the user to perform operating input to the information processing device 10, which operating section is different from the touch sensors 30. FIG. 1A and FIG. 1B show, as an example of operating members constituting the operating keys 32, direction keys 36 (in the present embodiment, for example, an upward direction key 36U, a downward direction key 36D, a left direction key 36L, and a right direction key 36R), front surface buttons 38 (in the present embodiment, for example, an up button 38U, a down button 38D, a left button 38L, a right button 38R, a command button 38C, a start button 38ST, and a selecting button 38SE), upper side surface buttons 40 (an L-button 40L and an R-button 40R), and analog sticks 42 (in the present embodiment, for example, a left analog stick 42L and a right analog stick 42R).

The analog stick 42 is capable of tilting operation from a predetermined reference position, for example. Then, the information processing device 10 according to the present embodiment can grasp present tilt states (attitudes) of the left analog stick 42L and the right analog stick 42R.

The upward direction key 36U, the downward direction key 36D, the right direction key 36R, and the left direction key 36L are arranged on the upper left of the touch panel 34 disposed in the front surface of the casing 12 of the information processing device 10 according to the present embodiment. Then, the left analog stick 42L is disposed on the lower right of these four direction keys 36. Then, the command button 38C is disposed on the lower left of the left analog stick 42L. The up button 38U, the down button 38D, the left button 38L, and the right button 38R are disposed on the upper right of the touch panel 34. The right analog stick 42R is disposed on the lower left of these four front surface buttons 38. Then, the selecting button 38SE and the start button 38ST are arranged side by side from the left on the lower right of the right analog stick 42R.

Then, the L-button 40L is disposed on the left side of the upper side surface of the casing 12 of the information processing device 10 according to the present embodiment, and the R-button 40R is disposed on the right side of the upper side surface. In addition, grips 44 for enabling the user to hold the information processing device 10 firmly with hands are formed on the left and right of the rear touch sensor 30*b* disposed in the rear surface of the casing 12 of the information processing device 10 according to the present embodiment.

Incidentally, in addition to the above-described members, the information processing device 10 according to the present embodiment may include for example slots that information storage media such as various kinds of memory cards or the like can be inserted into and removed from, a speaker, a sound volume adjusting button for adjusting the volume of output sound, a power button for giving an instruction to start or end power supply to the information processing device 10, a USB port, an acceleration sensor, and the like. In addition, the above-described slots may read a program, data, and the like recorded on the information storage media such as memory cards or the like inserted in the slots, and write data to the inserted information storage media such as memory cards or the like, according to instructions from the control section 20. In addition, the slots, the sound volume adjusting button, and the power button may be arranged in the upper side surface of the casing 12 of the information processing device 10, for example.

[Functions]

Figure 3:
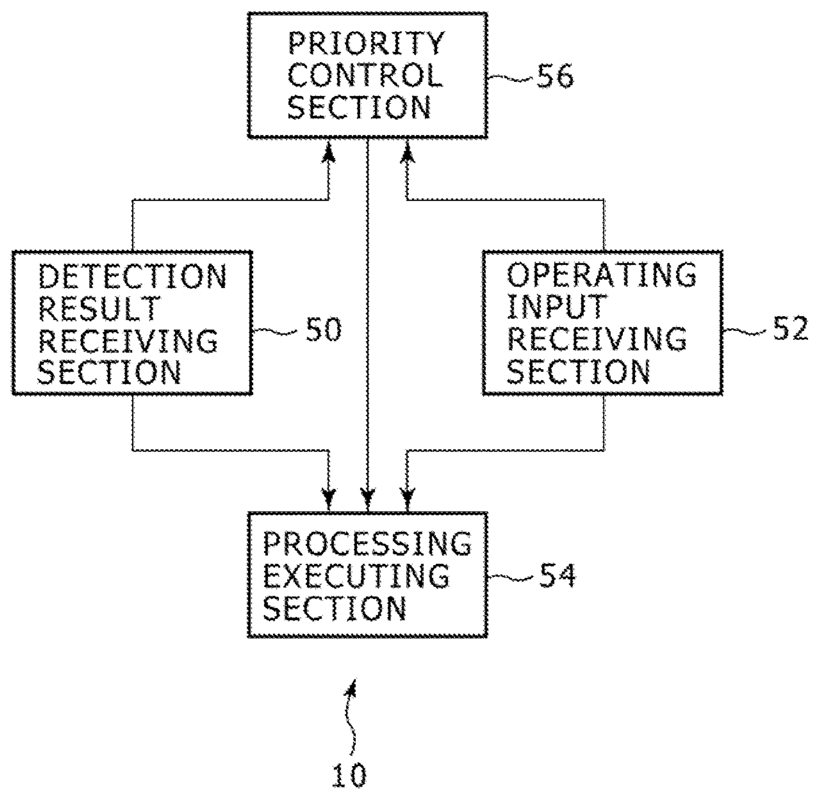
FIG. 3 is a functional block diagram showing an example of functions implemented in the information processing device according to one embodiment of the present invention.

FIG. 3 is a functional block diagram showing an example of functions implemented by the information processing device 10 according to the present embodiment. As shown in FIG. 3, the information processing device 10 according to the present embodiment functionally includes for example a detection result receiving section 50, an operating input receiving section 52, a processing executing section 54, a priority control section 56, and the like. These parts are implemented by executing a program according to the present embodiment in the information processing device 10, which is a computer. The program includes for example instructions for controlling the computer so as to constitute the parts shown in FIG. 3. In addition, this program may be downloaded from another computer via a communicating interface by way of a computer communication network and provided to the information processing device 10, or may be stored on a computer readable information storage medium such as an optical disk (for example a CD-ROM, a DVD-ROM, a Blu-ray (registered trademark) disk, or the like), a USB memory, a memory card, or the like and provided from the information storage medium to the information processing device 10.

In the present embodiment, the front touch sensor 30*a* and the rear touch sensor 30*b* sequentially detect the contact of an object on the detecting surface and output a detection result (detected position) corresponding to the contact position of the object to the detection result receiving section 50 at predetermined time intervals. In the present embodiment, for example, each of the front touch sensor 30*a* and the rear touch sensor 30*b* outputs, to the detection result receiving section 50, detected position data including the coordinates of the detected position detected by the front touch sensor 30*a* or the rear touch sensor 30*b* (which coordinates will be referred to as detected position coordinates) which coordinates are expressed by a combination of an X-coordinate value and a Y-coordinate value and a touch flag indicating whether the front touch sensor 30*a* is touched or whether the rear touch sensor 30*b* is touched. Then, the detection result receiving section 50 receives the detected position data. Thus, in the present embodiment, the detection result receiving section 50 receives an operating input to the touch sensors 30. Incidentally, in the present embodiment, when the front touch sensor 30*a* does not detect the contact of an object on the detecting surface in timing for detecting the contact of an object on the detecting surface, the front touch sensor 30*a* outputs detected position data including detected position coordinates having Null values to the detection result receiving section 50. In addition, when the rear touch sensor 30*b* does not detect the contact of an object on the detecting surface, the rear touch sensor 30*b* outputs detected position data including detected position coordinates having Null values to the detection result receiving section 50.

Receiving the detected position data, the detection result receiving section 50 associates the detected position data with a reception date and time, and stores the detected position data as detection history data in the storage section 22 included in the information processing device 10.

In the present embodiment, the operating keys 32 other than the analog sticks 42 each output depression data representing a digital value indicating whether or not the operating key is depressed (in the present embodiment, for example, the digital value is one when the operating key is depressed, and is zero when the operating key is not depressed), the depression data being associated with identifying information of the operating key, to the operating input receiving section 52 at predetermined time intervals.

In addition, the left analog stick 42L and the right analog stick 42R output attitude data (X, Y) (where each of X and Y is an integer of any one of 0 to 255) indicating tilts in the X-axis direction and the Y-axis direction from a reference position, the attitude data being associated with identifying information of the left analog stick 42L and the right analog stick 42R, to the operating input receiving section 52 at predetermined time intervals. Specifically, for example, X=127, X=128, and vicinities thereof indicate that the analog stick 42 is not tilted in the X-axis direction. In addition, X=255 indicates that the analog stick 42 is tilted to a limit in the positive direction of the X-axis. Further, X=0 indicates that the analog stick 42 is tilted to a limit in the negative direction of the X-axis. In addition, for example, Y=127, Y=128, and vicinities thereof indicate that the analog stick 42 is not tilted in the Y-axis direction. In addition, Y=255 indicates that the analog stick 42 is tilted to a maximum in the positive direction of the Y-axis. Further, Y=0 indicates that the analog stick 42 is tilted to a maximum in the negative direction of the Y-axis.

Then, the operating input receiving section 52 in the present embodiment receives, at predetermined time intervals, for example, the depression data of each of the operating keys 32 other than the analog sticks 42, the depression data being associated with the identifying information of the operating key 32, and the attitude data of the left analog stick 42L and the right analog stick 42R, the attitude data being associated with the identifying information of the analog sticks 42.

Receiving the depression data or the attitude data, the operating input receiving section 52 associates the data with a reception date and time, and stores the data as input history data in the storage section 22 included in the information processing device 10.

The processing executing section 54 for example executes a program stored on an information storage medium inserted in a slot or a program installed in the information processing device 10 in advance to perform for example processing of generating an image according to a received operating signal and displaying the image on the touch panel 34. In addition, in the present embodiment, the processing executing section 54 performs processing according to detected position data received by the detection result receiving section 50 and processing according to an operating signal received by the operating input receiving section 52.

[System Setting Menu Image]

Figure 4A:
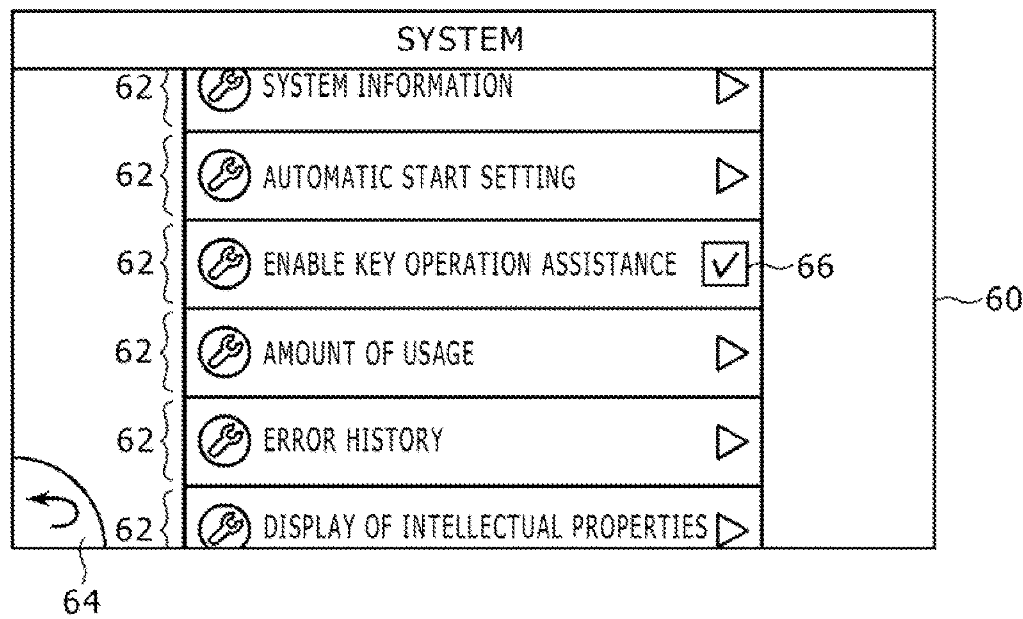
FIG. 4A is a diagram showing an example of a system setting menu image.

FIG. 4A is a diagram showing an example of a system setting menu image 60 for making settings related to the information processing device 10, the system setting menu image 60 being displayed on the touch panel 34 of the information processing device 10 according to the present embodiment. A plurality of setting item images 62 each showing a corresponding setting item are arranged in a vertical column in the center of the system setting menu image 60. In the present embodiment, suppose that a region occupied by the whole of the plurality of setting item images 62 is a rectangular region extending along a predetermined scrolling direction (in the present embodiment, for example, the Y-axis direction), and that a side of the region which side extends in the Y-axis direction is longer than a length in the vertical direction of a screen of the display section 28. Then, the information processing device 10 according to the present embodiment cannot display the whole of the plurality of setting item images 62 on the display section 28 at a time, but displays only a part of the region occupied by the whole of the plurality of setting item images 62 on the display section 28. In the present embodiment, a part or all of the plurality of setting item images 62 are displayed on the touch panel 34. In addition, a back icon 64 for giving an instruction to make a transition to another image (for example an image displayed on the touch panel 34 before the system setting menu image 60 is displayed) is disposed at a lower left edge of the system setting menu image 60.

The processing executing section 54 for example performs processing of displaying various kinds of images such as the system setting menu image 60 and the like on the touch panel 34. A check box 66 is disposed at a right edge of a setting item image 62 in which a character string "ENABLE KEY OPERATION ASSISTANCE" is entered, the setting item image 62 being disposed in the system setting menu image 60 illustrated in FIG. 4A. This setting item image 62 is a setting item image 62 for making a setting as to whether or not to allow one or a plurality of predetermined operations (hereinafter referred to as specific operations) to be performed by the operating keys 32. The information processing device 10 according to the present embodiment assumes that operating inputs are performed by the touch panel 34. Thus, the specific operations cannot be performed by the operating keys 32 unless the check box 66 shown in FIG. 4A is in a checked state.

Each time the user performs a tap operation (an operation of tapping a finger or the like) on the check box 66, the processing executing section 54 changes the value of operation propriety data indicating whether or not to allow the specific operations to be performed by the operating keys 32, the value of the operation propriety data being stored in the storage section of the information processing device 10 according to the present embodiment in advance, from one to zero or from zero to one. Incidentally, a default value of the operation propriety data in the present embodiment is zero. Therefore, the information processing device 10 according to the present embodiment in an initial state does not allow the specific operations to be performed by the operating keys 32. Then, the processing executing section 54 updates the system setting menu image 60 displayed on the touch panel 34.

The processing executing section 54 in the present embodiment for example displays the system setting menu image 60 in which the check box 66 is in a checked state on the touch panel 34 when the value of the operation propriety data is one, and displays the system setting menu image 60 in which the check box 66 is in an unchecked state on the touch panel 34 when the value of the operation propriety data is zero. Therefore, according to a change in the value of the operation propriety data, the check box 66 disposed in the system setting menu image 60 changes between the checked state and the unchecked state.

Incidentally, in the present embodiment, suppose that when the touch sensors 30 detect the contact of an object (that is, when the detection result receiving section 50 receives detected position data indicating a position tapped by a finger or the like (which position will hereinafter be referred to as a tap position)), and thereafter the touch sensors 30 do not detect the contact of the object (that is, the detection result receiving section 50 receives detected position data including detected position coordinates having Null values from both of the front touch sensor 30*a* and the rear touch sensor 30*b*), the processing executing section 54 performs processing according to the detected position data indicating the above-described tap position (for example processing of updating the value of the operation propriety data from one to zero and updating the system setting menu image 60 displayed on the touch panel 34 such that the check box 66 is changed from the checked state to the unchecked state, processing of updating the value of the operation propriety data from zero to one and updating the system setting menu image 60 displayed on the touch panel 34 such that the check box 66 is changed from the unchecked state to the checked state, or the like).

In the present embodiment, for example, when the value set in the operation propriety data is one, in response to reception of an operating input of a specific operation by an operating key 32, the processing executing section 54 performs processing according to the operating input. In addition, in the present embodiment, for example, when the value set in the operation propriety data is zero, the processing executing section 54 does not perform processing according to an operating input of a specific operation by an operating key 32 even when the operating input is received.

Description in the following will be made of processing of displaying various kinds of images on the touch panel 34, which processing is performed by the information processing device 10 according to the present embodiment when the value set in the operation propriety data is one.

Figure 4B:
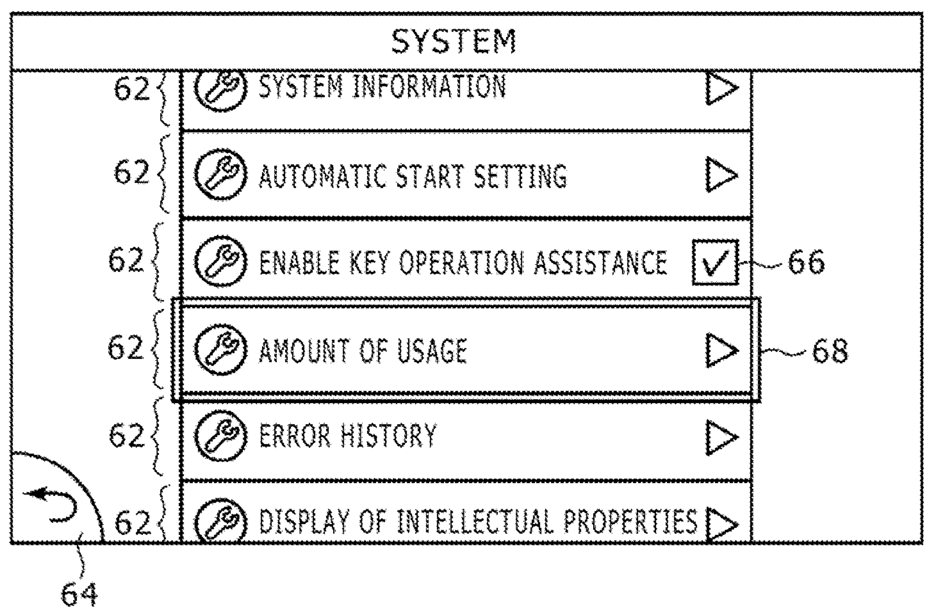
FIG. 4B is a diagram showing an example of the system setting menu image.

For example, when one of the direction keys 36 or the right button 38R is depressed while the system setting menu image 60 illustrated in FIG. 4A is displayed on the touch panel 34, the operating input receiving section 52 receives the depression data. Then, the processing executing section 54 updates the system setting menu image 60 so as to change from a state in which no highlighting image 68 is displayed as illustrated in FIG. 4A to a state in which a highlighting image 68 enclosing one of the setting item images 62 is displayed as illustrated in FIG. 4B. The highlighting image 68 that highlights one of the plurality of options (the setting item images 62 or the back icon 64 in the example of FIG. 4A and FIG. 4B) is thus displayed on the touch panel 34.

In the present embodiment, in performing display control for displaying the highlighting image 68, that is, display control for changing from the state in which no highlighting image 68 is displayed to the state in which the highlighting image 68 enclosing one of the options is displayed, the processing executing section 54 controls a position at which the highlighting image 68 is displayed.

In the present embodiment, for example, when detected position data associated with a reception date and time after a point in time that the system setting menu image 60 is displayed on the touch panel 34 is stored as detection history data in the storage section 22, the processing executing section 54 disposes the highlighting image 68 so as to enclose an option disposed at a position identified on the basis of detected position coordinates included in the detected position data (which option is for example a setting item image 62 or the back icon 64 in this case). Incidentally, in the present embodiment, one of the options is highlighted by displaying the highlighting image 68. However, an option may be highlighted by another method. For example, an option to be highlighted may be displayed in a larger size than the other options, an arrow image indicating an option to be highlighted may be displayed, or an option to be highlighted may be displayed in a color or lightness different from the other setting item images.

In this case, when there are a plurality of pieces of detected position data associated with reception dates and times after the point in time that the system setting menu image 60 is displayed on the touch panel 34, the processing executing section 54 for example disposes the highlighting image 68 so as to enclose an option (for example a setting item image 62 or the back icon 64 in this case) disposed at a position identified on the basis of detected position coordinates included in detected position data associated with a latest reception date and time (detected position data indicating a detected position detected on the touch panel 34 immediately before a point in time that the operating input to the operating key 32 is received).

In this case, in the present embodiment, for example, when a setting item image 62 or the back icon 64 includes therewithin the above-described detected position coordinates, the processing executing section 54 disposes the highlighting image 68 so as to enclose the setting item image 62 or the back icon 64. In addition, for example, when no setting item image 62 includes therewithin the above-described detected position coordinates, the processing executing section 54 disposes the highlighting image 68 so as to enclose a setting item image 62 or the back icon 64 whose central position is closest to the detected position coordinates included in the detected position data.

When detected position data associated with a reception date and time after the point in time that the system setting menu image 60 is displayed on the touch panel is not stored as detection history data in the storage section 22, the processing executing section 54 disposes the highlighting image 68 so as to enclose a setting item image 62 or the back icon 64 as an option determined according to a predetermined rule (which option will hereinafter be referred to as a default option).

The above-described processing of controlling the position at which to display the highlighting image 68 (option highlighted by the highlighting image 68) in performing display control for changing from the state in which the highlighting image 68 is not displayed to the state in which the highlighting image 68 enclosing one of the options is displayed will hereinafter be referred to as display position control processing.

In the case of an image in which at least part of options (setting item images 62 in the example of FIG. 4A and FIG. 4B) are arranged in one vertical column (or in one horizontal row) as in the system setting menu image 60 illustrated in FIG. 4A and FIG. 4B, a setting item image 62 disposed at an uppermost position (or a leftmost position), for example, is determined as the default option. Incidentally, of course, a setting item image 62 disposed at a lowermost position (or a rightmost position), for example, may be determined as the default option.

Each time the downward direction key 36D is thereafter depressed in the state in which the highlighting image 68 enclosing one of the setting item images 62 is displayed on the touch panel 34, the processing executing section 54 updates the system setting menu image 60 displayed on the touch panel 34 such that the setting item image 62 enclosed by the highlighting image 68 is changed to the setting item image 62 disposed directly below. In addition, each time the upward direction key 36U is depressed in the state in which the highlighting image 68 enclosing one of the setting item images 62 is displayed on the touch panel 34, the processing executing section 54 updates the system setting menu image 60 displayed on the touch panel 34 such that the setting item image 62 enclosed by the highlighting image 68 is changed to the setting item image 62 disposed directly above.

Then, when the right button 38R is depressed, the processing executing section 54 determines processing corresponding to the setting item image 62 enclosed by the highlighting image 68 as processing to be performed, and performs the processing. For example, when the right button 38R is depressed while the setting item image 62 in which "ERROR HISTORY" is entered is enclosed by the highlighting image 68, the processing executing section 54 updates the image displayed on the touch panel 34 such that a list of errors that have occurred in the information processing device 10 is displayed.

Thus, in the information processing device 10 according to the present embodiment, the right button 38R is assigned for an operation for performing the processing according to the option highlighted by the highlighting image 68. Then, when the information processing device 10 according to the present embodiment receives the operation associated with the execution of the processing according to the option highlighted by the highlighting image 68 (which operation is for example the operation of depressing the right button 38R in this case) while the highlighting image 68 is displayed on the touch panel 34, the information processing device 10 performs the processing according to the option highlighted by the highlighting image 68 (for example processing of displaying a list of errors that have occurred in the information processing device 10).

In addition, in the information processing device 10 according to the present embodiment, at least a part of operating signals received from the operating keys 32 and operation contents for the touch sensors 30 are managed in association with each other in advance. Then, in performing processing according to an operating signal received from an operating key 32, the processing executing section 54 performs operation contents for the touch sensors 30 which operation contents are associated with the operating key 32.

Specifically, for example, as described above, when the right button 38R is depressed, the processing executing section 54 performs processing that is performed when a tap operation on a position within the setting item image 62 enclosed by the highlighting image 68 (the position being for example the centroid of the setting item image 62) is received. In addition, for example, when the down button 38D is depressed, the processing executing section 54 performs processing that is performed when a tap operation on a position within the image associated with the down button 38D and disposed in the system setting menu image 60 (which image is for example the back icon 64) (the position being for example the centroid of the back icon 64) is received (which processing is for example processing of displaying an image displayed on the touch panel 34 before the system setting menu image 60 is displayed on the touch panel 34).

In addition, in the case where the highlighting image 68 is displayed on the touch panel 34, when a state of no valid input being performed by any of the operating keys 32 has continued for a predetermined time (specifically, for example, when a state has continued for a predetermined time in which state there is neither an operating key 32 other than the analog sticks 42 which operating key has a value of one as depression data received by the operating input receiving section 52 nor an analog stick 42 that has a distance exceeding a predetermined threshold value, the distance being between the coordinate values represented by the attitude data (X, Y) of the analog stick 42 which attitude data (X, Y) is received by the operating input receiving section 52 and reference coordinate values (for example (127, 127) or (128, 128))), or when an object comes into contact with a touch sensor 30 (for example the touch sensor 30 is tapped by a finger or the like), the processing executing section 54 stores information identifying the setting item image 62 enclosed by the highlighting image 68 disposed in the system setting menu image 60 (which information will hereinafter be referred to as option identifying information) in the storage section 22, and updates the system setting menu image 60 displayed on the touch panel 34 such that the highlighting image 68 is not displayed. Thus, in the present embodiment, the highlighting image 68 disappears from the system setting menu image 60 while the state in which the setting item image 62 enclosed by the highlighting image 68 is displayed on the touch panel 34 is maintained.

Then, when one of the direction keys 36 or the right button 38R is thereafter depressed without any object having come into contact with the touch sensors 30 (without the detection result receiving section 50 having received detected position data whose values are not "Null"), for example, the processing executing section 54 disposes the highlighting image 68 enclosing the setting item image 62 identified by option identifying information stored last in the storage section 22 when the highlighting image 68 disappeared from the system setting menu image 60 (that is, latest option identifying information stored by the storage section 22) in the system setting menu image 60 again.

Thus, in the present embodiment, in a case where the highlighting image 68 is displayed on the touch panel 34 again without any object having come into contact with the touch sensors 30 after the highlighting image 68 enclosing the setting item image 62 in which "ERROR HISTORY" is entered disappeared from the touch panel 34, for example, the setting item image 62 in which "ERROR HISTORY" is entered is enclosed by the highlighting image 68.

In the present embodiment, as described above, when the highlighting image 68 is displayed on the touch panel 34, the processing performed by the processing executing section 54 differs for each of cases where the downward direction key 36D, the upward direction key 36U, and the right button 38R are depressed. The information processing device 10 according to the present embodiment thus includes a plurality of operating keys 32 for mutually different pieces of processing to be performed according to operating input when the highlighting image 68 is displayed. On the other hand, when the highlighting image 68 is not displayed on the touch panel 34, the processing executing section 54 performs the processing of displaying the highlighting image 68 on the touch panel 34, whichever one of direction keys 36 such as the downward direction key 36D and the upward direction key 36U or the like or the right button 38R is depressed. In addition, the option highlighted by the highlighting image 68 (for example the setting item image 62) is the same, whichever one of the above-described operating keys 32 is depressed.

[Deletion Object Content Selecting Image]

Figure 5A:
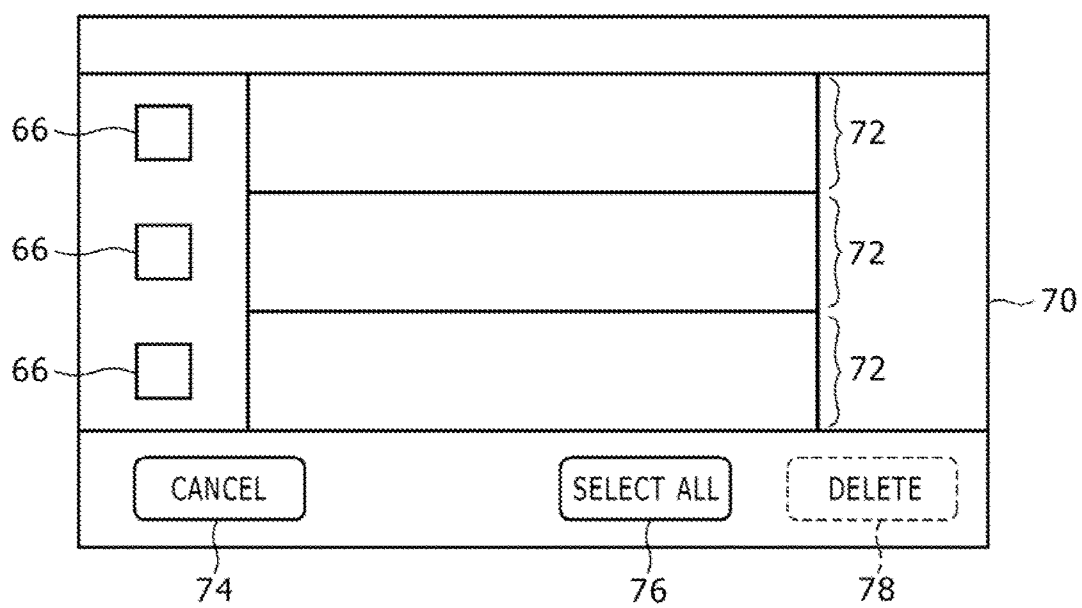
FIG. 5A is a diagram showing an example of a deletion object content selecting image.

FIG. 5A is a diagram showing an example of a deletion object content selecting image 70 for selecting contents (moving images, music, or the like) to be deleted from among contents stored in the information processing device 10, the deletion object content selecting image 70 being displayed on the touch panel 34 of the information processing device 10. A plurality of content corresponding images 72 each associated with contents are arranged in one vertical column in the center of the deletion object content selecting image 70. The names of contents, for example, are entered in the content corresponding images 72. Disposed on the left of each of the content corresponding images 72 is a check box 66 for selecting the contents corresponding to the content corresponding image 72 as a deletion object. A cancellation icon 74 is disposed on the lower left of the deletion object content selecting image 70. An all selection icon 76 (entered as "SELECT ALL" in FIG. 5A) and a deletion icon 78 are arranged side by side from the left in this order on the lower right of the deletion object content selecting image 70.

In addition, in the present embodiment, the deletion icon 78 is displayed in a state in which processing corresponding to the icon cannot be performed (disabled state) when none of the check boxes 66 is in a checked state. The deletion icon 78 is displayed in a state in which the processing corresponding to the icon can be performed (enabled state) when at least one check box 66 is in a checked state. In FIG. 5A, the disabled state of the deletion icon 78 is represented by showing the frame of the deletion icon 78 by a broken line.

Figure 5B:
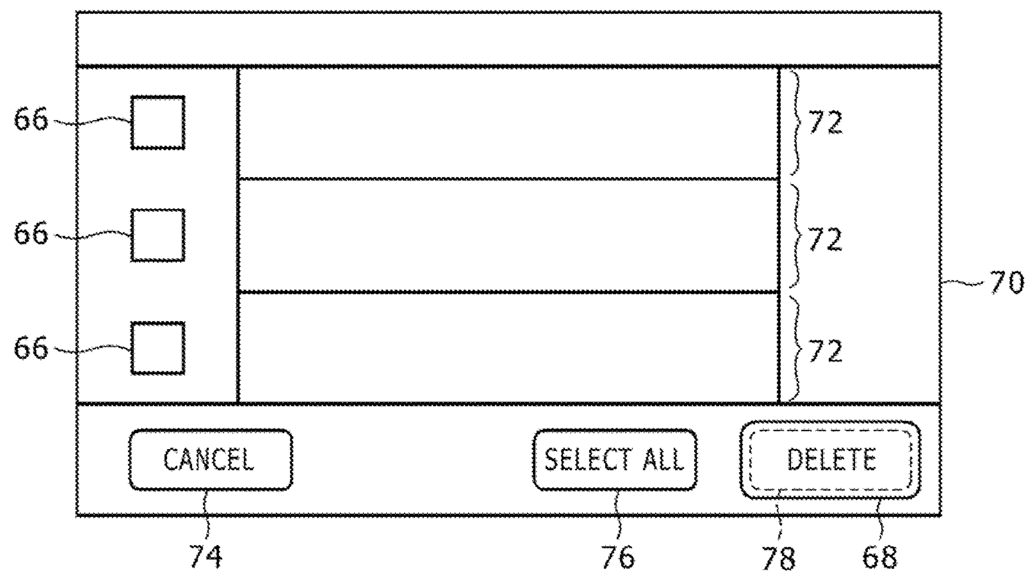
FIG. 5B is a diagram showing an example of the deletion object content selecting image.

When one of the direction keys 36 or the right button 38R is depressed while the deletion object content selecting image 70 illustrated in FIG. 5A is displayed on the touch panel 34 but the highlighting image 68 is not displayed, the processing executing section 54 displays, on the touch panel 34, the highlighting image 68 enclosing one of the options, which option is determined from among the cancellation icon 74, the all selection icon 76, or the deletion icon 78, on the basis of the above-described display position control processing. FIG. 5B is a diagram showing an example of the deletion object content selecting image 70 in which the deletion icon 78 is enclosed by the highlighting image 68.

In the present embodiment, when an option associated with processing of canceling execution (so-called cancellation processing) is included in the options displayed on the touch panel 34, the option (the cancellation icon 74 in the example of FIG. 5A and FIG. 5B) is determined as a default option.

Then, when the left direction key 36L is depressed, the processing executing section 54 updates the deletion object content selecting image 70 displayed on the touch panel 34 such that the icon enclosed by the highlighting image 68 is changed to the icon disposed on the left of the icon enclosed by the highlighting image 68. When the right direction key 36R is depressed, the processing executing section 54 updates the deletion object content selecting image 70 displayed on the touch panel 34 such that the icon enclosed by the highlighting image 68 is changed to the icon disposed on the right of the icon enclosed by the highlighting image 68. In addition, in the present embodiment, when the right direction key 36R is depressed in a case where the highlighting image 68 enclosing the all selection icon 76 is disposed in the deletion object content selecting image 70 and the deletion icon 78 is in the disabled state, the processing executing section 54 updates the deletion object content selecting image 70 displayed on the touch panel 34 such that the icon enclosed by the highlighting image 68 is changed to the deletion icon 78 in the disabled state. The present embodiment thus allows even an icon in the disabled state to be highlighted by the highlighting image 68.

When the right button 38R is depressed while one of the icons is enclosed by the highlighting image 68, the processing executing section 54 determines processing corresponding to the icon enclosed by the highlighting image 68 as processing to be performed, and performs the processing. For example, when the right button 38R is depressed while the cancellation icon 74 is enclosed by the highlighting image 68, the processing executing section 54 updates the image displayed on the touch panel 34 to another image (for example an image for selecting contents to be reproduced). When the right button 38R is depressed while the all selection icon 76 is enclosed by the highlighting image 68, the processing executing section 54 updates the deletion object content selecting image 70 such that all of the check boxes 66 are in a checked state. When the right button 38R is depressed while the deletion icon 78 in the enabled state is enclosed by the highlighting image 68, the processing executing section 54 deletes contents corresponding to a check box 66 in a checked state (contents corresponding to the content corresponding image 72 disposed on the right of the check box 66 in the checked state) from the storage section 22.

Incidentally, for example, in a case where the icon in the disabled state is enclosed by the highlighting image 68, when the detection result receiving section 50 or the operating input receiving section 52 receives an operation for changing the icon to the enabled state, the processing executing section 54 may update the icon to the enabled state while the icon remains enclosed by the highlighting image 68. In addition, for example, when the detection result receiving section 50 or the operating input receiving section 52 receives an operation for changing the icon in the disabled state to the enabled state while the highlighting image 68 is not displayed on the touch panel 34, the processing executing section 54 may display the highlighting image 68 enclosing the icon changed to the enabled state on the touch panel 34.

[Password Input Image]

Figure 6A:
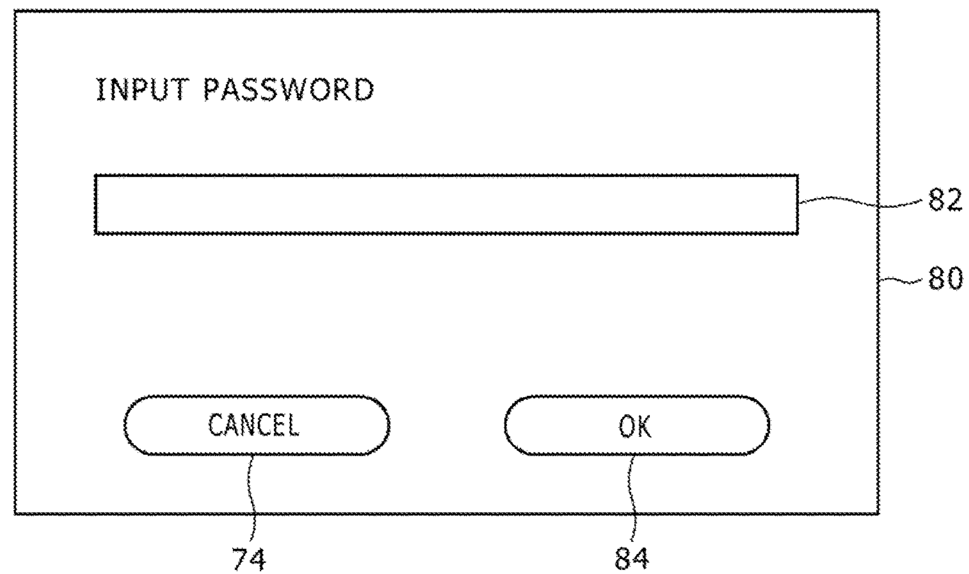
FIG. 6A is a diagram showing an example of a password input image.

FIG. 6A is a diagram showing an example of a password input image 80 for inputting a password, the password input image 80 being displayed on the touch panel 34 of the information processing device 10. A form 82 for inputting a password is disposed in the center of the password input image 80. In addition, a cancellation icon 74 and an OK icon 84 are arranged side by side from the left in this order on the lower side of the password input image 80.

Figure 6B:
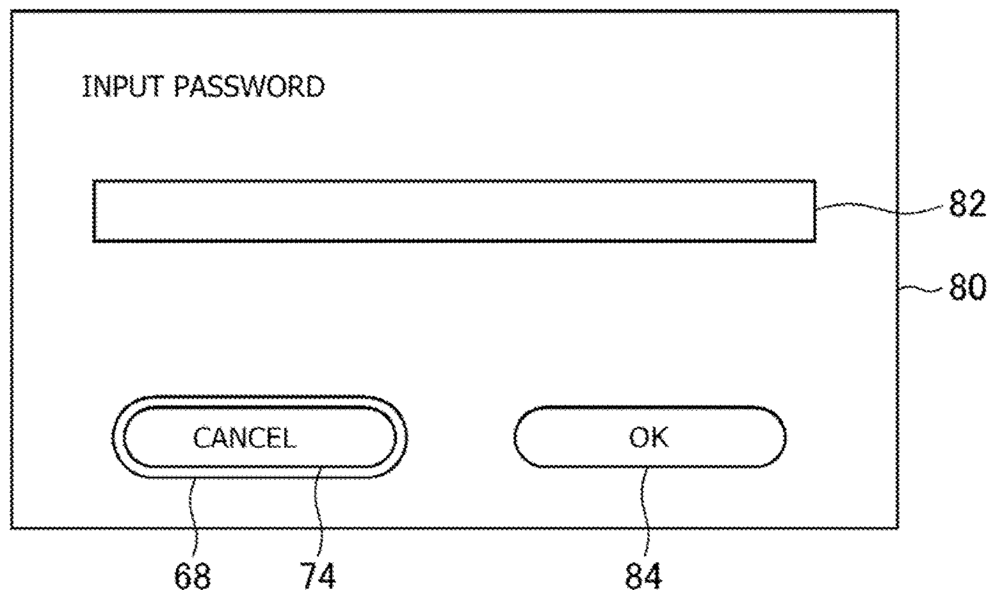
FIG. 6B is a diagram showing an example of the password input image.

When one of the direction keys 36 or the right button 38R is depressed while the password input image 80 illustrated in FIG. 6A is displayed on the touch panel 34 but the highlighting image 68 is not displayed, the processing executing section 54 displays, on the touch panel 34, the highlighting image 68 enclosing an option determined from the cancellation icon 74 or the OK icon 84 on the basis of the above-described display position control processing. Incidentally, in the password input image 80, the cancellation icon 74 is determined as a default option. FIG. 6B is a diagram showing an example of the deletion object content selecting image 70 in which the cancellation icon 74 is enclosed by the highlighting image 68.

Then, when the left direction key 36L is depressed, the processing executing section 54 updates the deletion object content selecting image 70 displayed on the touch panel 34 such that an icon enclosed by the highlighting image 68 is changed to the icon disposed on the left of the icon enclosed by the highlighting image 68. When the right direction key 36R is depressed, the processing executing section 54 updates the deletion object content selecting image 70 displayed on the touch panel 34 such that an icon enclosed by the highlighting image 68 is changed to the icon disposed on the left of the icon enclosed by the highlighting image 68.

For example, when the right button 38R is depressed while the cancellation icon 74 is enclosed by the highlighting image 68, the processing executing section 54 updates the image displayed on the touch panel 34 to another image (for example an image displayed before the password input image 80 is displayed). When the right button 38R is depressed while the OK icon 84 is enclosed by the highlighting image 68, the processing executing section 54 performs authentication processing on the basis of a password input in the form 82.

[Home Menu Image]

Figure 7A:
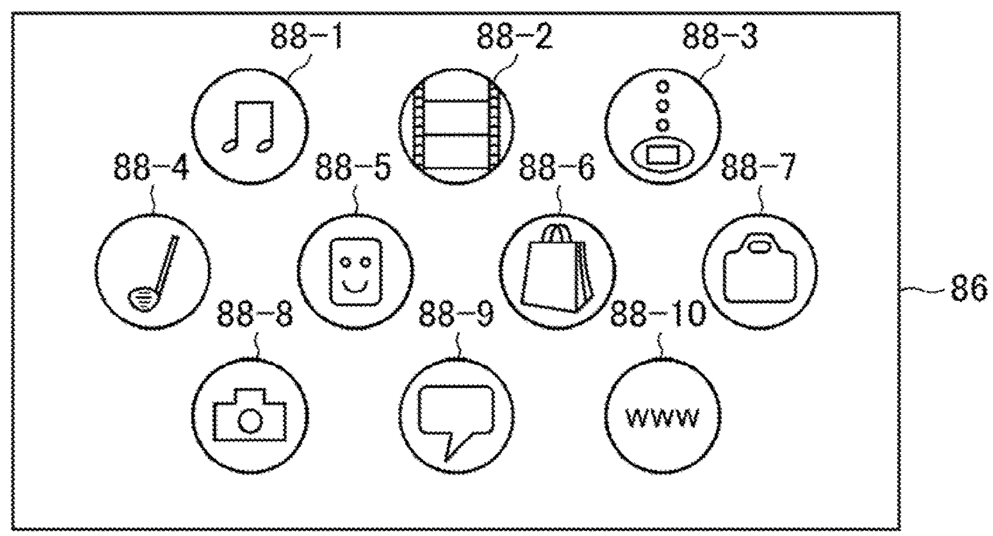
FIG. 7A is a diagram showing an example of a home menu image.

FIG. 7A is a diagram showing an example of a home menu image 86 displayed on the touch panel 34 of the information processing device 10. In the home menu image 86, 10 program corresponding icons 88 (88-1 to 88-10) are arranged which program corresponding icons correspond respectively to programs to be executed in the information processing device 10. A first program corresponding icon 88-1, a second program corresponding icon 88-2, and a third program corresponding icon 88-3 are arranged side by side from the left in this order in one horizontal row on the upper side of the home menu image 86. A fourth program corresponding icon 88-4, a fifth program corresponding icon 88-5, a sixth program corresponding icon 88-6, and a seventh program corresponding icon 88-7 are arranged side by side from the left in this order in one horizontal row in the center of the home menu image 86. An eighth program corresponding icon 88-8, a ninth program corresponding icon 88-9, and a tenth program corresponding icon 88-10 are arranged side by side from the left in this order in one horizontal row on the lower side of the home menu image 86.

Figure 7B:
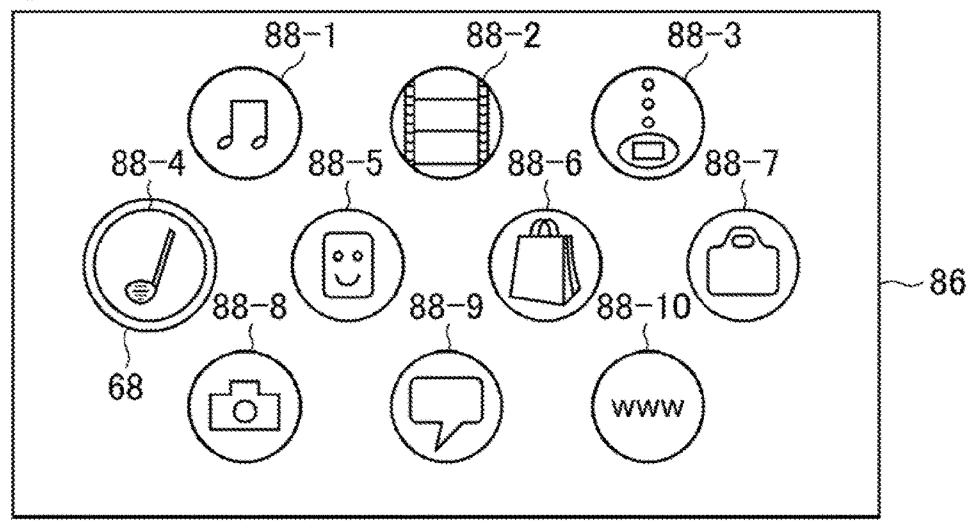
FIG. 7B is a diagram showing an example of the home menu image.

When one of the direction keys 36 or the right button 38R is depressed while the home menu image 86 illustrated in FIG. 7A is displayed on the touch panel 34 but the highlighting image 68 is not displayed, the processing executing section 54 displays, on the touch panel 34, the highlighting image 68 enclosing one of the program corresponding icons 88 that is determined on the basis of the above-described display position control processing. FIG. 7B is a diagram showing an example of the home menu image 86 in which the fourth program corresponding icon 88-4 is enclosed by the highlighting image 68.

Then, when the left direction key 36L is depressed, the processing executing section 54 updates the home menu image 86 displayed on the touch panel 34 such that the icon enclosed by the highlighting image 68 is changed to the icon disposed on the left of the icon enclosed by the highlighting image 68. When the right direction key 36R is depressed, the processing executing section 54 updates the home menu image 86 displayed on the touch panel 34 such that the icon enclosed by the highlighting image 68 is changed to the icon disposed on the right of the icon enclosed by the highlighting image 68. When the upward direction key 36U is depressed, the processing executing section 54 updates the home menu image 86 displayed on the touch panel 34 such that the icon enclosed by the highlighting image 68 is changed to the icon disposed on the upper left or the upper right of the icon enclosed by the highlighting image 68. When the downward direction key 36D is depressed, the processing executing section 54 updates the home menu image 86 displayed on the touch panel 34 such that the icon enclosed by the highlighting image 68 is changed to the icon disposed on the lower left or the lower right of the icon enclosed by the highlighting image 68.

Incidentally, in the present embodiment, when an nth (n=1, 2, or 3) program corresponding icon 88 is enclosed by the highlighting image 68 and the downward direction key 36D is depressed twice, the icon enclosed by the highlighting image 68 is changed to an (n+7)th program corresponding icon 88 disposed directly below the nth program corresponding icon 88. In addition, in the present embodiment, when an mth (m=8, 9, or 10) program corresponding icon 88 is enclosed by the highlighting image 68 and the upward direction key 36U is depressed twice, the icon enclosed by the highlighting image 68 is changed to an (m−7)th program corresponding icon 88 disposed directly above the mth program corresponding icon 88.

Figure 8A:
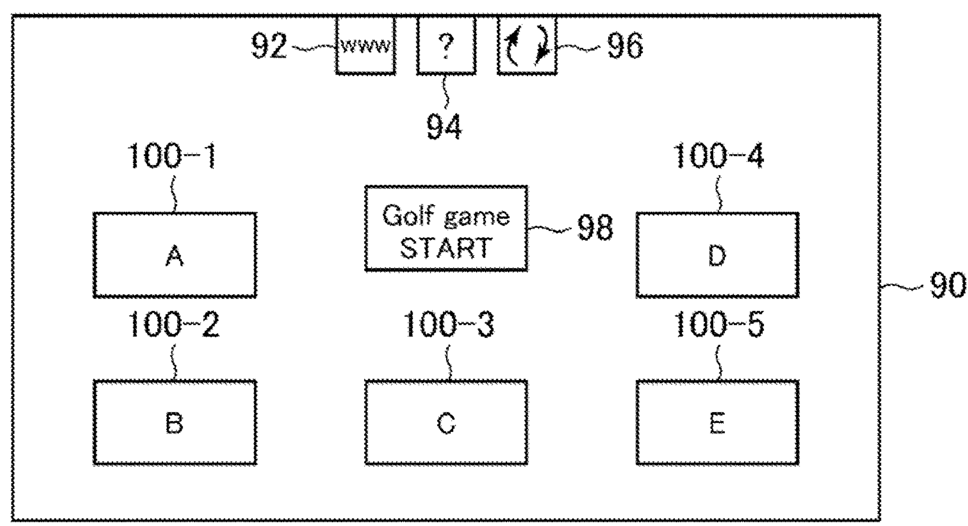
FIG. 8A is a diagram showing an example of a live area image.

When the right button 38R is depressed while one of the program corresponding icons 88 is enclosed by the highlighting image 68, the processing executing section 54 updates the image displayed on the touch panel 34 to a live area image 90 of the program corresponding icon 88 enclosed by the highlighting image 68, the live area image 90 being illustrated in FIG. 8A.

[Live Area Image]

FIG. 8A is a diagram showing an example of the live area image 90 for giving instructions to perform various processing related to a program to be executed (program associated with one of the program corresponding icons 88), the live area image 90 being displayed on the touch panel 34 of the information processing device 10. FIG. 8A shows, as an example, the live area image 90 corresponding to a game program of a golf game. The game program is a program corresponding to the fourth program corresponding icon 88-4.

A WWW icon 92, a help icon 94, and an update icon 96 are arranged side by side from the left on the upper side of the live area image 90. A start image 98 is disposed in the center of the live area image 90. Arranged on the left of, on the lower left of, below, on the right of, and on the lower right of the start image 98 are processing corresponding images 100 (a first processing corresponding image 100-1, a second processing corresponding image 100-2, a third processing corresponding image 100-3, a fourth processing corresponding image -4, and a fifth processing corresponding image -5), respectively, that are assigned predetermined processing (for example processing of displaying a Web page of a shopping site via a browser and the like). In addition, the first processing corresponding image 100-1 and the fourth processing corresponding image 100-4 are disposed slightly below a position in which the start image 98 is disposed.

Figure 8B:
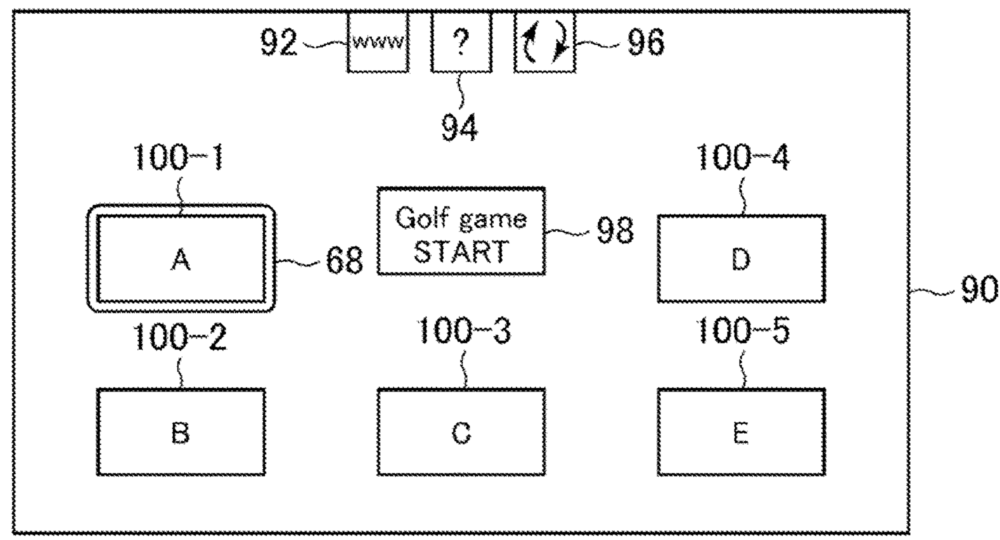
FIG. 8B is a diagram showing an example of the live area image.

When one of the direction keys 36 or the right button 38R is depressed while the live area image 90 illustrated in FIG. 8A is displayed on the touch panel 34 but the highlighting image 68 is not displayed, the processing executing section 54 displays, on the touch panel 34, the highlighting image 68 enclosing one of the options that is determined from among the WWW icon 92, the help icon 94, the update icon 96, the start image 98, the first processing corresponding image 100-1, the second processing corresponding image 100-2, the third processing corresponding image 100-3, the fourth processing corresponding image 100-4, or the fifth processing corresponding image 100-5 on the basis of the above-described display position control processing. FIG. 8B is a diagram showing an example of the live area image 90 in which the first processing corresponding image 100-1 is enclosed by the highlighting image 68.

Then, when the left direction key 36L is depressed, the processing executing section 54 updates the live area image 90 displayed on the touch panel 34 such that the option enclosed by the highlighting image 68 is changed to the option disposed on the left of the option enclosed by the highlighting image 68. When the right direction key 36R is depressed, the processing executing section 54 updates the live area image 90 displayed on the touch panel 34 such that the option enclosed by the highlighting image 68 is changed to the icon disposed on the right of the option enclosed by the highlighting image 68. When the upward direction key 36U is depressed, the processing executing section 54 updates the live area image 90 displayed on the touch panel 34 such that the option enclosed by the highlighting image 68 is changed to the icon disposed above the option enclosed by the highlighting image 68. When the downward direction key 36D is depressed, the processing executing section 54 updates the live area image 90 displayed on the touch panel 34 such that the option enclosed by the highlighting image 68 is changed to the option disposed below the option enclosed by the highlighting image 68.

When the right button 38R is depressed while one of the options (for example an icon or an image in this case) is enclosed by the highlighting image 68, the processing executing section 54 determines processing corresponding to the option enclosed by the highlighting image 68 as processing to be performed, and performs the processing.

For example, when the right button 38R is depressed while the start image 98 is enclosed by the highlighting image 68, the processing executing section 54 starts to execute the corresponding program (the game program of the golf game in this case). When the right button 38R is depressed while a processing corresponding image 100 is enclosed by the highlighting image 68, the processing executing section 54 performs processing corresponding to the processing corresponding image 100. When the right button 38R is depressed while the WWW icon 92 is enclosed by the highlighting image 68, the processing executing section 54 displays a Web page corresponding to the displayed live area image 90 on the touch panel 34 via a browser. When the right button 38R is depressed while the help icon 94 is enclosed by the highlighting image 68, the processing executing section 54 displays a help page of the program (the game program of the golf game in this case) on the touch panel 34.

In the present embodiment, there are cases where the option enclosed by the highlighting image 68 ceases to be displayed on the touch panel 34 when the highlighting image 68 is displayed on the touch panel 34. For example, in a case where the right button 38R is depressed while the update icon 96 is enclosed by the highlighting image 68, the processing corresponding images 100 arranged in the live area image 90 may be updated as illustrated in FIG. 8C.

Figure 8C:
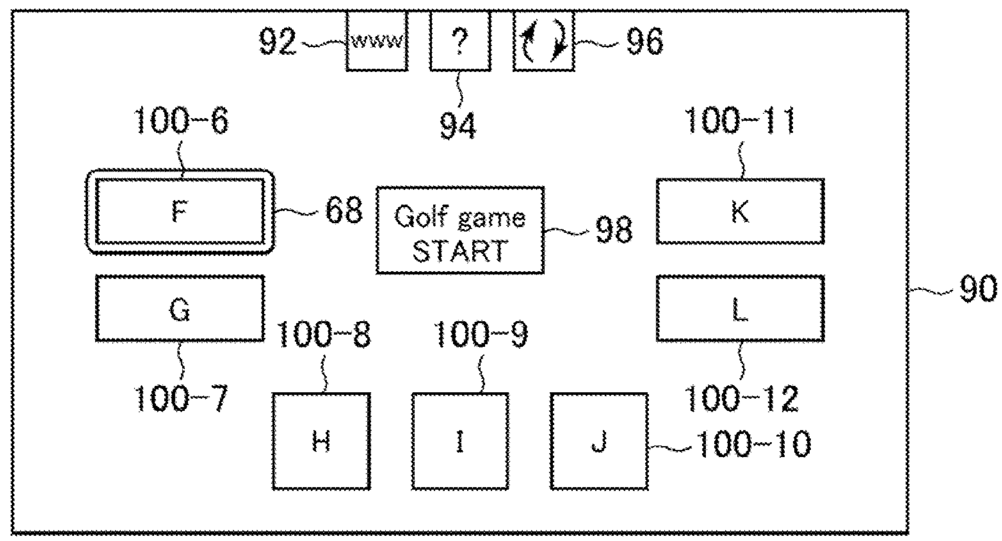
FIG. 8C is a diagram showing an example of the live area image.

In the example of FIG. 8C, a sixth processing corresponding image 100-6 and a seventh processing corresponding image 100-7 are arranged from the top in this order on the left of the start image 98. In addition, an eighth processing corresponding image 100-8, a ninth processing corresponding image 100-9, and a tenth processing corresponding image 100-10 are arranged from the left in this order below the start image 98. In addition, an eleventh processing corresponding image 100-11 and a twelfth processing corresponding image 100-12 are arranged from the top in this order on the right of the start image 98.

In this case, the processing executing section 54 changes the option enclosed by the highlighting image 68 from the option that has ceased to be displayed to another option. For example, in the case where the first processing corresponding image 100-1 is enclosed by the highlighting image 68 as shown in FIG. 8B, when the arrangement of the processing corresponding images 100 in the live area image 90 has changed to the state shown in FIG. 8C, the live area image 90 is updated such that the sixth processing corresponding image 100-6 disposed at a position closest from a position in which the first processing corresponding image 100-1 was disposed is enclosed by the highlighting image 68.

In addition, in the present embodiment, when the highlighting image 68 is not displayed on the touch panel 34, and option identifying information is stored in the storage section 22, the option identified by the option identifying information may cease to be displayed on the touch panel 34. In this case, the processing executing section 54 changes the option identifying information to one of the options arranged in the live area image 90 after being changed. For example, in a case where option identifying information identifying the first processing corresponding image 100-1 is stored in the storage section 22, when the arrangement of the processing corresponding images 100 in the live area image 90 changes from the state shown in FIG. 8A to a state in which the arrangement of the processing corresponding images 100 is similar to that of FIG. 8C but the highlighting image 68 is not displayed as shown in FIG. 8D, the processing executing section 54 changes the option identifying information stored in the storage section 22 to option identifying information identifying the sixth processing corresponding image 100-6 disposed at the position closest from the position in which the first processing corresponding image 100-1 was disposed.

[Date and Time Setting Image]

Figures 8D, 9A:
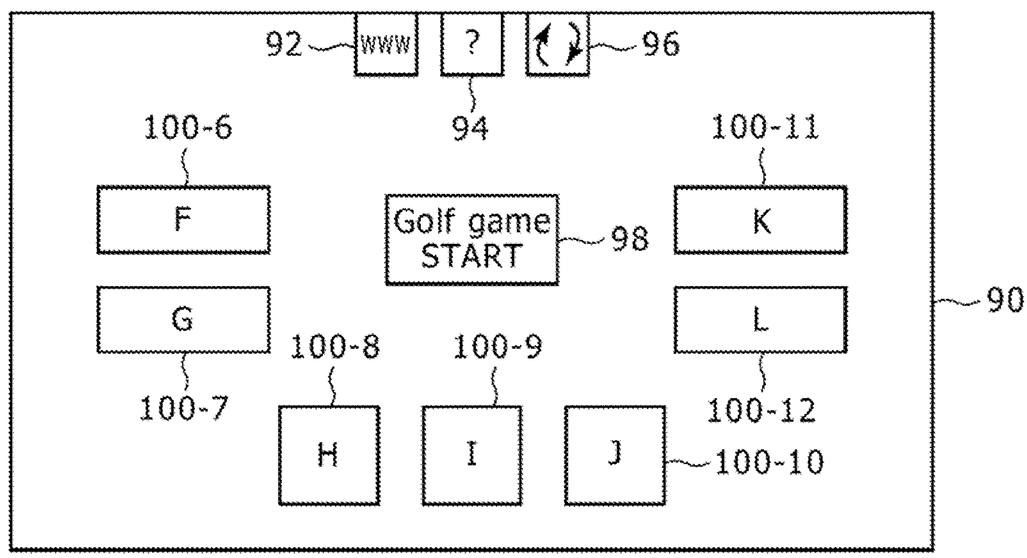
FIG. 8D is a diagram showing an example of the live area image.
FIG. 9A is a diagram showing an example of a date and time setting image.

FIG. 9A is a diagram showing an example of a date and time setting image 102 for making settings related to a date and time, the date and time setting image 102 being displayed on the touch panel 34 of the information processing device 10. A plurality of candidate values to be set as time zones are arranged side by side as options in one vertical column in the right half of the date and time setting image 102.

Figure 9B:
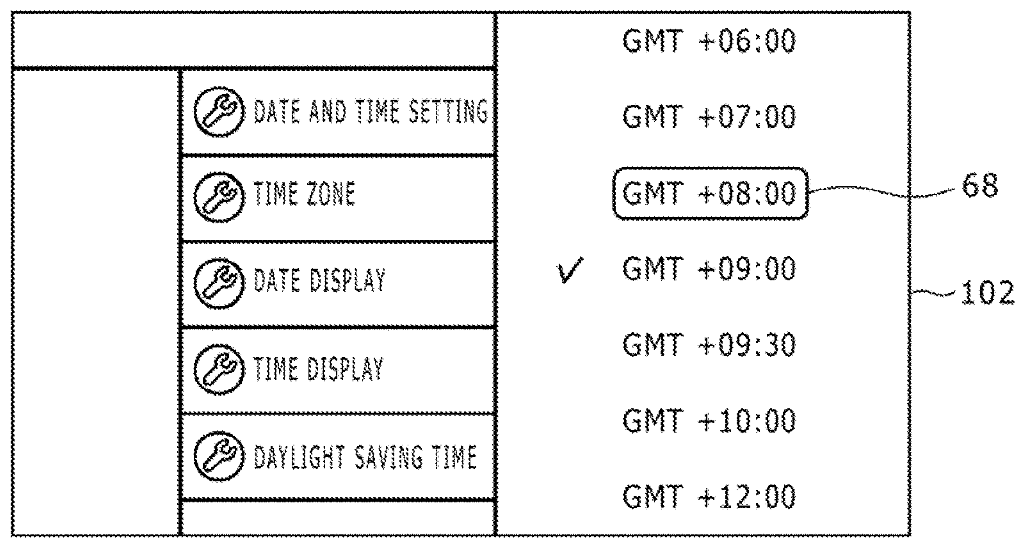
FIG. 9B is a diagram showing an example of the date and time setting image.

When one of the direction keys 36 or the right button 38R is depressed while the date and time setting image 102 illustrated in FIG. 9A is displayed on the touch panel 34 but the highlighting image 68 is not displayed, the processing executing section 54 displays the highlighting image 68 enclosing one of the candidate values on the touch panel 34. FIG. 9B is a diagram showing an example of the date and time setting image 102 in which a candidate value as "GMT+08:00" is enclosed by the highlighting image 68. In the date and time setting image 102, the value set as a value of a time zone is determined as a default option.

Then, when the upward direction key 36U is depressed, the processing executing section 54 updates the date and time setting image 102 displayed on the touch panel 34 such that the option enclosed by the highlighting image 68 is changed to the option disposed above the option enclosed by the highlighting image 68. When the downward direction key 36D is depressed, the processing executing section 54 updates the date and time setting image 102 displayed on the touch panel 34 such that the option enclosed by the highlighting image 68 is changed to the option disposed below the option enclosed by the highlighting image 68.

For example, when the right button 38R is depressed while one of the candidate values is enclosed by the highlighting image 68, the processing executing section 54 changes the value of the time zone to the value enclosed by the highlighting image 68.

[Shopping Store Image]

Figure 10A:
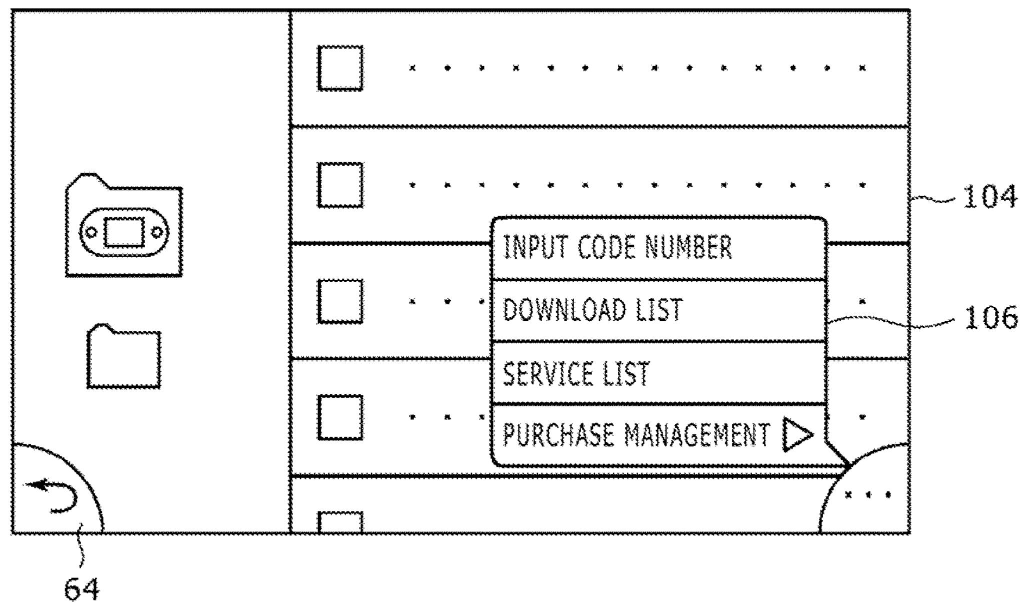
FIG. 10A is a diagram showing an example of a shopping site image.

FIG. 10A is a diagram showing an example of a shopping store image 104 for purchasing a program or contents, the shopping store image 104 being displayed on the touch panel 34 of the information processing device 10. An option list image 106 in which a plurality of character strings each associated with processing are arranged side by side as options in one vertical column is disposed in the lower right of the shopping store image 104. The option list image 106 is disposed when the up button 38U is depressed while no option list image 106 is disposed in the shopping store image 104. A back icon 64 is disposed in the lower left of the shopping store image 104.

Figure 10B:
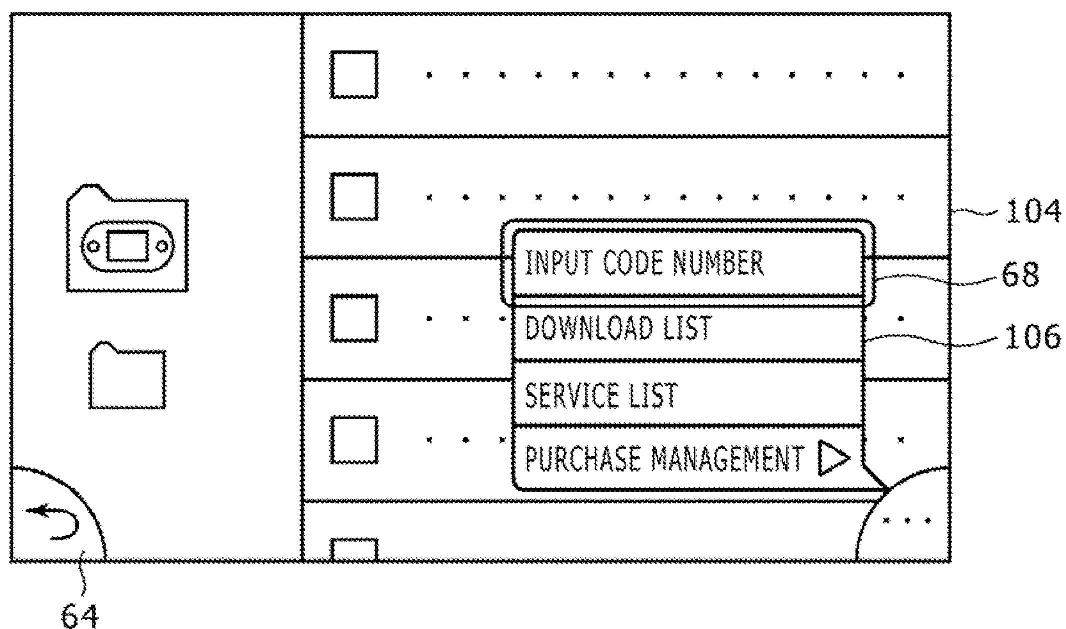
FIG. 10B is a diagram showing an example of the shopping site image.

When one of the direction keys 36 or the right button 38R is depressed while the shopping store image 104 is displayed on the touch panel 34 and the highlighting image 68 is not displayed as illustrated in FIG. 10A, the processing executing section 54 displays, on the touch panel 34, the highlighting image 68 enclosing one of the options arranged in the option list image 106. FIG. 10B is a diagram showing an example of the shopping store image 104 in which a character string "INPUT CORD NUMBER" is enclosed by the highlighting image 68. In the shopping store image 104, the option disposed at an uppermost position in the option list image 106 is determined as a default option.

Then, when the upward direction key 36U is depressed, the processing executing section 54 updates the shopping store image 104 displayed on the touch panel 34 such that the option enclosed by the highlighting image 68 is changed to the option disposed above the option enclosed by the highlighting image 68. When the downward direction key 36D is depressed, the processing executing section 54 updates the shopping store image 104 displayed on the touch panel 34 such that the option enclosed by the highlighting image 68 is changed to the option disposed below the option enclosed by the highlighting image 68.

For example, when the right button 38R is depressed while one of the options is enclosed by the highlighting image 68, the processing executing section 54 performs processing corresponding to the option (for example processing of displaying a download list or the like).

[Example of Change in Display Mode of Highlighting Image]

Description in the following will be made of an example of change in the display mode of the highlighting image 68 in a process of a change from a state in which the highlighting image 68 is not displayed to a state in which the highlighting image 68 enclosing one of options is displayed.

Figure 11A:
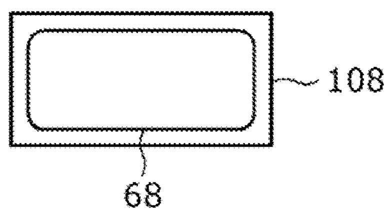
FIG. 11A is a diagram schematically showing an example of change in the display mode of a highlighting image.
Figure 11B:
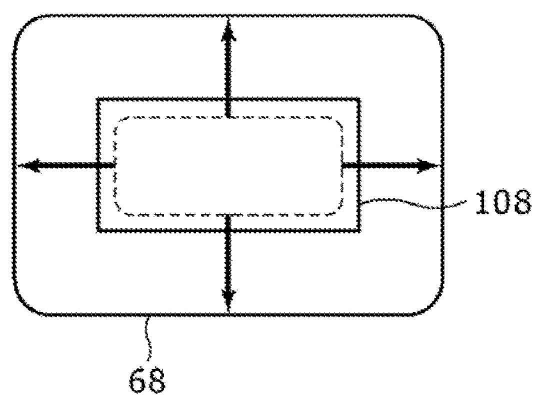
FIG. 11B is a diagram schematically showing an example of change in the display mode of the highlighting image.
Figure 11C:
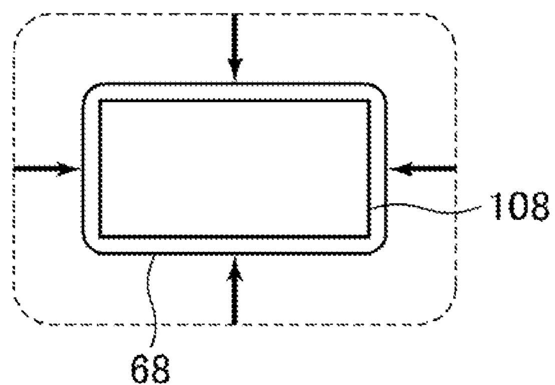
FIG. 11C is a diagram schematically showing an example of change in the display mode of the highlighting image.

FIG. 11A, FIG. 11B, and FIG. 11C are diagrams schematically showing an example of changes in the display mode of the highlighting image 68. First, as shown in FIG. 11A, the processing executing section 54 disposes the highlighting image 68 in a region smaller than an option corresponding region 108 as a region associated with an option in advance, the region smaller than the option corresponding region 108 occupying a part of the option corresponding region 108. Thus, for example, the highlighting image 68 enclosing the region smaller than the option corresponding region 108, the region smaller than the option corresponding region 108 occupying a part of the option corresponding region 108, is disposed. Then, as shown in FIG. 11B, the processing executing section 54 gradually increases the size of the highlighting image 68 so as to change to a state in which the highlighting image 68 is disposed in a region larger than the option corresponding region 108, a part of the region larger than the option corresponding region 108 occupying the option corresponding region 108. In FIG. 11B, the highlighting image 68 in the state shown in FIG. 11A is represented by a broken line. In addition, in FIG. 11B, the change in the size of the highlighting image 68 is indicated by arrows. Thus, for example, the highlighting image 68 enclosing the region larger than the option corresponding region 108, a part of the region larger than the option corresponding region 108 occupying the option corresponding region 108, is disposed. Then, shown in FIG. 11C, the processing executing section 54 gradually decreases the size of the highlighting image 68 so as to change to a state in which the highlighting image 68 is disposed on the option corresponding region 108. In FIG. 11C, the highlighting image 68 in the state shown in FIG. 11B is represented by a broken line. In addition, in FIG. 11C, the change in the size of the highlighting image 68 is indicated by arrows. Thus, for example, the highlighting image 68 enclosing the option corresponding region 108 is disposed.

[Others]

Incidentally, with regard to any of the processing described above, images to be processed are not limited. For example, the processing described as processing on the system setting menu image 60 may be performed on the deletion object content selecting image 70 or another image.

In the present embodiment, when the left analog stick 42L is tilted to the left by a predetermined amount or more, the processing executing section 54 performs processing to be performed when the left direction key 36L is depressed (for example processing of changing the option enclosed by the highlighting image 68 to the option disposed on the left of the option enclosed by the highlighting image 68). In addition, when the right analog stick 42R is tilted to the right by a predetermined amount or more, the processing executing section 54 performs processing to be performed when the right direction key 36R is depressed (for example processing of changing the option enclosed by the highlighting image 68 to the option disposed on the right of the option enclosed by the highlighting image 68).

In addition, in the present embodiment, some operating keys 32 are assigned, in advance, processing to be performed when the operating keys 32 are depressed. In addition, in the present embodiment, the user can assign operating keys 32 processing to be performed when the operating keys 32 are depressed. When the operating keys 32 are depressed, the processing executing section 54 performs the processing assigned to the operating keys 32 (for example processing of reproducing a moving image and the like). In addition, in the present embodiment, when an operating key 32 assigned processing to be performed when the operating key 32 is depressed as described above is depressed while the highlighting image 68 is not displayed on the touch panel 34, the processing executing section 54 displays the highlighting image 68 on the touch panel 34 as in a case where one of the direction keys 36 or the right button 38R is depressed.

In addition, in the present embodiment, according to an operation of the right analog stick 42R, the processing executing section 54 for example changes the enlargement ratio of an image displayed on the touch panel 34 or changes the reproduction speed of a moving image being reproduced. In addition, in the present embodiment, for example, according to a depression of the L-button 40L or the R-button 40R, processing of changing information displayed on the touch panel 34 (contents, a page, or the like) to other information is performed.

[Priority Control]

In the present embodiment, for example, priority setting data indicating a setting as to whether to give a high priority to operating input to the touch sensors 30 or whether to give a high priority to operating input to the operating keys 32 is stored in the storage section of the information processing device 10 in advance. Then, in the present embodiment, for example, when the value of the priority setting data is one, the processing executing section 54 gives a high priority to operating input to the touch sensors 30, and when the value of the priority setting data is zero, the processing executing section 54 gives a high priority to operating input to the operating keys 32. Then, the priority control section 56 performs control as to whether to give a high priority to operating input to the touch sensors 30 or whether to give a high priority to operating input to the operating keys 32.

An example of processing performed by the information processing device 10 according to the present embodiment when the value of the above-described operation propriety data is one will be described in the following with reference to a state transition diagram of FIG. 12. Incidentally, the value of the priority setting data at a time of a start of execution of the processing to be described in the following may be one or zero.

Figure 12:
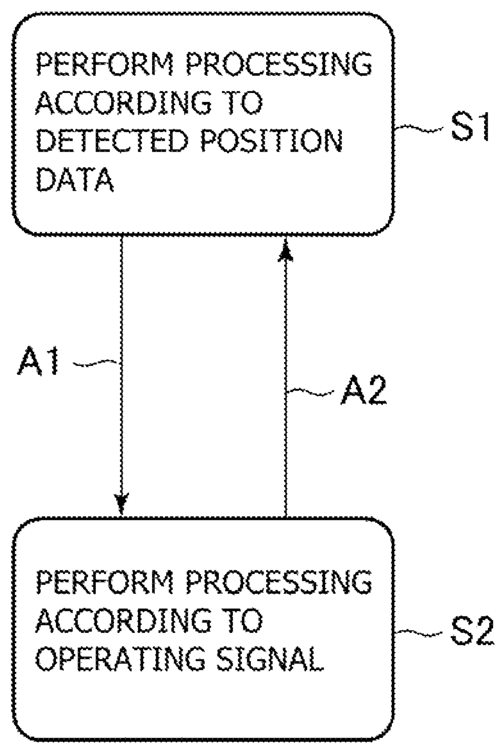
FIG. 12 is a state transition diagram of an example of processing performed in the information processing device according to one embodiment of the present invention.

For example, when the value of the priority setting data is one, the information processing device 10 repeatedly performs two pieces of processing, that is, receiving detected position data by the detection result receiving section 50 and performing processing according to the detected position data by the processing executing section 54, in order at predetermined time intervals (state S1 in FIG. 12).

Then, in parallel with the repeated performance of these two pieces of processing, the priority control section 56 for example determines, at predetermined time intervals, whether or not a valid operation has been performed on one of the operating keys 32 on the basis of a latest operating signal received by the operating input receiving section 52 (in the present embodiment, for example, depression data received in relation to each of the operating keys 32 other than the analog sticks 42 and attitude data received from each of the analog sticks 42).

In this case, specifically, for example, the priority control section 56 determines that a valid operation has been performed on one of the operating keys 32 when there is an operating key 32 other than the analog sticks 42 which operating key has a value of one as depression data received by the operating input receiving section 52 or an analog stick 42 that has a distance exceeding a predetermined threshold value, the distance being between the coordinate values represented by the attitude data (X, Y) of the analog stick 42 which attitude data (X, Y) is received by the operating input receiving section 52 and reference coordinate values (for example (127, 127) or (128, 128)).

Then, when the priority control section 56 determines that a valid operation has been performed on one of the operating keys 32, the priority control section 56 outputs a notification that operating input to the operating keys 32 is given a high priority to the processing executing section 54. Then, when the processing executing section 54 has received the notification from the priority control section 56, the processing executing section 54 changes the value of the priority setting data from one to zero. Then, the processing executing section 54 stops the processing according to the detected position data received by the detection result receiving section 50. Then, the processing executing section 54 starts to perform processing according to the operating signal received by the operating input receiving section 52 (for example depression data or attitude data) (arrow A1 in FIG. 12).

For example, when the value of the priority setting data is zero, the information processing device 10 repeatedly performs two pieces of processing, that is, receiving an operating signal by the operating input receiving section 52 and performing processing according to the operating signal by the processing executing section 54, in order at predetermined time intervals (state S2 in FIG. 12).

Then, in parallel with the repeated performance of these two pieces of processing, the priority control section 56 for example determines, at predetermined time intervals, whether or not a valid contact operation has been performed on one of the touch sensors 30 on the basis of latest detected position data received by the detection result receiving section 50.

In this case, specifically, for example, the priority control section 56 determines that a valid contact operation has been performed on one of the touch sensors 30 when the detection result receiving section 50 has received detected position data whose values are not "Null."

Then, when the priority control section 56 determines that a valid contact operation has been performed on one of the touch sensors 30, the priority control section 56 outputs a notification that operating input to the touch sensors 30 is given a high priority to the processing executing section 54. Then, when the processing executing section 54 has received the notification from the priority control section 56, the processing executing section 54 changes the value of the priority setting data to one. Then, the processing executing section 54 stops the processing according to the operating signal received by the operating input receiving section 52. Then, the processing executing section 54 starts to perform processing according to the detected position data received by the detection result receiving section 50 (arrow A2 in FIG. 12).

Thus, in the present embodiment, when the value of the operation propriety data is one, the processing executing section 54 selectively performs, according to the value of the priority setting data, processing according to a detection result received by the detection result receiving section 50 or processing according to an operating signal received by the operating input receiving section 52. Thus, in the present embodiment, while the processing executing section 54 performs one of the pieces of processing according to an operating input to one of a touch sensor 30 or an operating key 32, the performance of processing according to an operating input to the other is limited.

In the present embodiment, when the value of the operation propriety data is zero, the information processing device 10 ignores operating signals received by the operating input receiving section 52, and repeatedly performs two pieces of processing, that is, receiving detected position data by the detection result receiving section 50 and performing processing according to the detected position data by the processing executing section 54, in order at predetermined time intervals.

Description in the following will be made of a concrete example of processing performed in the information processing device 10 according to the present embodiment. Incidentally, suppose in the following that the value of the operation propriety data is set to one.

For example, when one of the direction keys 36 is depressed while the system setting menu image 60 illustrated in FIG. 4A is displayed on the touch panel 34, the processing executing section 54 updates the system setting menu image 60 such that the highlighting image 68 enclosing one of the setting item images 62 is displayed as illustrated in FIG. 4B. Then, thereafter, when a state in which the downward direction key 36D is depressed continues (that is, the downward direction key 36D is depressed long) or the downward direction key 36D is depressed a plurality of consecutive times, the processing executing section 54 successively updates the system setting menu image 60 displayed on the touch panel 34 such that the setting item image 62 enclosed by the highlighting image 68 is sequentially changed to a next setting item image 62 disposed in a downward direction with the passage of time. Incidentally, in the present embodiment, one of the setting item images 62 is highlighted by displaying the highlighting image 68. However, a setting item image 62 may be highlighted by another method. For example, a setting item image 62 to be highlighted may be displayed in a larger size than the other setting item images 62, an arrow image indicating a setting item image 62 to be highlighted may be displayed, or a setting item image 62 to be highlighted may be displayed in a color or lightness different from the other setting item images.

Incidentally, at this time, for example, when the setting item image 62 enclosed by the highlighting image 68 is not displayed on the touch panel 34, the processing executing section 54 may move (scroll) a region occupied by the whole of the plurality of setting item images 62 in an upward direction. In this case, when a tap operation is performed on the touch panel 34, the processing executing section 54 stops changing the setting item image 62 enclosed by the highlighting image 68 and scrolling the region occupied by the whole of the plurality of setting item images 62, and performs processing according to the setting item image 62 disposed at a tapped position. For example, when a tap operation is performed on a setting item image 62 in which a character string "ERROR HISTORY" is entered, the processing executing section 54 updates the image displayed on the touch panel 34 such that a list of errors that have occurred in the information processing device 10 is displayed.

Thus, in the present embodiment, by giving a higher priority to processing according to operation on the touch panel 34 than to processing according to operation on the operating keys 32, the processing according to an operation on an operating key 32 can be stopped by an operation on the touch panel 34.

In addition, when the information processing device 10 receives an operating signal of an operating key 32 such as a direction key 36 or the like, for example, in a state in which a finger or the like is in contact with a tap position of the touch panel 34 in the system setting menu image 60 illustrated in FIG. 4A, but the finger or the like is not yet separated from the touch panel 34 (that is, in a state in which the processing executing section 54 is not performing processing according to the touch operation), the processing executing section 54 does not perform processing according to a setting item image 62 disposed at the tap position even when the finger or the like is thereafter separated from the touch panel 34.

Thus, in the present embodiment, processing according to an operation on the touch panel 34 can be stopped by an operation on an operating key 32.

In addition, in the information processing device 10 according to the present embodiment, at least a part of operating signals received from the operating keys 32 and operation contents for the touch sensors 30 are managed in association with each other in advance. Then, in performing processing according to an operating signal received from an operating key 32, the processing executing section 54 performs operation contents for the touch sensors 30 which operation contents are associated with the operating key 32.

Specifically, for example, when depression data indicating that the right button 38R is depressed is received, the processing executing section 54 performs processing to be performed when a tap operation on a position within the setting item image 62 enclosed by the highlighting image 68 is received (that is, when detected position data indicating a position within the setting item image 62 enclosed by the highlighting image 68 is received and thereafter detected position data including detected position coordinates having Null values is received). In addition, for example, when depression data indicating that the down button 38D is depressed is received, the processing executing section 54 performs processing to be performed when a tap operation on a position within the image (for example the back icon 64) associated with the down button 38D, the image being disposed in the system setting menu image 60, is received (for example processing of displaying, on the touch panel 34, an image displayed on the touch panel 34 before the system setting menu image 60 is displayed).

Description will next be made of another concrete example of processing performed in the information processing device 10 according to the present embodiment. Suppose in the following that the value of the operation propriety data is set to one.

Figure 13:
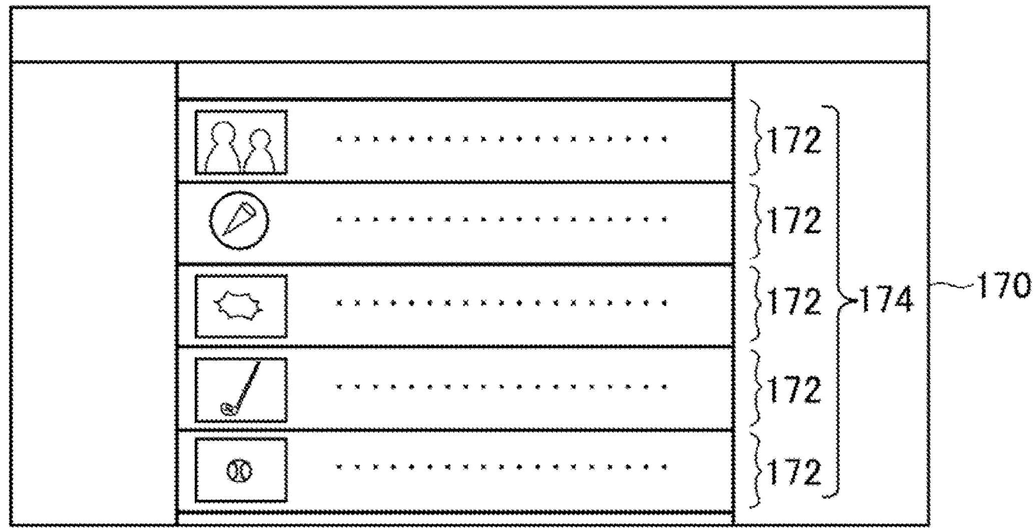
FIG. 13 is a diagram showing an example of a content selecting image.

FIG. 13 is a diagram showing an example of a content selecting image 170 for selecting contents (a movie, music, or the like) to be reproduced, the content selecting image 170 being displayed on the information processing device 10 according to the present embodiment. As shown in FIG. 13, a plurality of content corresponding images 172 each corresponding to contents are arranged side by side in one vertical column in the center of the content selecting image 170. A content corresponding image 172 includes for example an icon representing contents, the title of the contents, and the like. The plurality of content corresponding images 172 will hereinafter be referred to as an item list 174. In the present embodiment, suppose that a region occupied by the whole of the item list 174 is a rectangular region extending along a predetermined scrolling direction (in the present embodiment, for example, the Y-axis direction), and that a side of the region which side extends in the Y-axis direction is longer than the length in the vertical direction of the screen of the display section 28. Then, the information processing device 10 according to the present embodiment cannot display the whole of the item list 174 on the display section 28 at a time, but displays only a part of the region occupied by the whole of the item list 174 on the display section 28. In the present embodiment, a part or all of the item list 174 is displayed on the touch panel 34.

Figure 14:
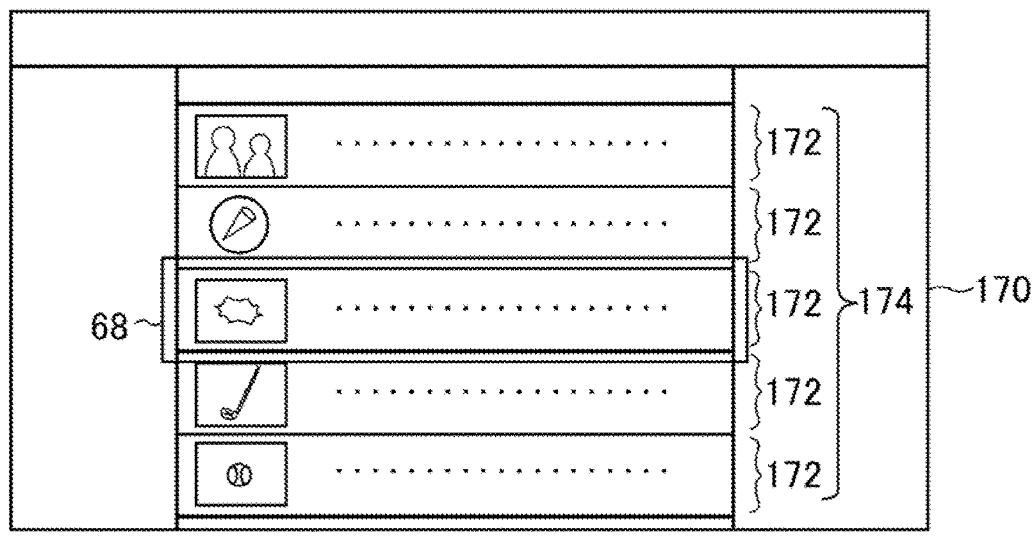
FIG. 14 is a diagram showing an example of the content selecting image.

For example, when one of the direction keys 36 is depressed while the content selecting image 170 illustrated in FIG. 13 is displayed on the touch panel 34, the processing executing section 54 updates the system setting menu image 60 such that the highlighting image 68 enclosing one of the content corresponding images 172 is displayed as illustrated in FIG. 14. Then, thereafter, when a state in which the downward direction key 36D is depressed continues (that is, the downward direction key 36D is depressed long) or the downward direction key 36D is depressed a plurality of consecutive times, the processing executing section 54 successively updates the content selecting image 170 displayed on the touch panel 34 such that the content corresponding image 172 enclosed by the highlighting image 68 is sequentially changed to a next content corresponding image 172 disposed in a downward direction with the passage of time.

Incidentally, at this time, for example, when the content corresponding image 172 enclosed by the highlighting image 68 is not displayed on the touch panel 34, the processing executing section 54 may move (scroll) a region occupied by the whole of the item list 174 in an upward direction. In this case, when a tap operation is performed on the touch panel 34, the processing executing section 54 stops changing the content corresponding image 172 enclosed by the highlighting image 68 and scrolling the region occupied by the whole of the item list 174, and performs processing according to the content corresponding image 172 disposed at a tapped position. For example, when a tap operation is performed on a content corresponding image 172, the processing executing section 54 starts to reproduce the contents corresponding to the content corresponding image 172 on which the tap operation is performed.

In addition, when the information processing device 10 receives an operating signal of an operating key 32 such as a direction key 36 or the like, for example, in a state in which a finger or the like is in contact with a tap position of the touch panel 34 in the content selecting image 170 illustrated in FIG. 13, but the finger or the like is not yet separated from the touch panel 34 (that is, in a state in which the processing executing section 54 is not performing processing according to the touch operation), the processing executing section 54 does not perform processing according to a content corresponding image 172 disposed at the tap position even when the finger or the like is thereafter separated from the touch panel 34.

It is to be noted that objects of control for performing processing according to an operating input to one of a touch sensor 30 or an operating key 32 as described above are of course not limited to the system setting menu image 60 or the content selecting image 170 described above. For example, various kinds of processing in a game program executed by the information processing device 10 may be set as objects of control for performing processing according to an operating input to one of a touch sensor 30 or an operating key 32.

It is to be noted that the present invention is not limited to the foregoing embodiment.

For example, correspondence relations between the operating keys 32 and processing performed when the operating keys 32 are depressed are not limited to the above-described correspondence relations. For example, when the down button 38D is depressed, the processing executing section 54 may perform processing according to an option enclosed by the highlighting image 68.

In addition, for example, same operation contents may be set to a plurality of operating keys 32. For example, when the L-button 40L is depressed, the processing executing section 54 may perform processing to be performed when the left direction key 36L is depressed (for example processing of changing an option enclosed by the highlighting image 68 to the option disposed on the left of the option enclosed by the highlighting image 68). In addition, for example, when the R-button 40R is depressed, the processing executing section 54 may perform processing to be performed when the right direction key 36R is depressed (for example processing of changing an option enclosed by the highlighting image 68 to the option disposed on the right of the option enclosed by the highlighting image 68).

In addition, for example, when a change is made from a state in which an operating key 32 is depressed to a state in which the operating key 32 is not depressed (when the operating key 32 is released), rather than when the operating key 32 is depressed, the processing executing section 54 may perform processing according to the operating key 32.

In addition, in the information processing device 10 according to the present embodiment, an operation when an operating input to the front touch sensor 30*a* is received may be different from an operation when an operating input to the rear touch sensor 30*b* is received. For example, a detection history of the front touch sensor 30*a* may be used to determine an option to be highlighted, and a detection history of the rear touch sensor 30*b* may not be used to determine an option to be highlighted. Specifically, for example, when detected position data including a touch flag indicating that the front touch sensor 30*a* was touched, the detected position data being associated with a reception date and time after a point in time that a plurality of options were displayed on the touch panel 34, is stored as detection history data in the storage section 22, the processing executing section 54 may highlight an option disposed at a position identified on the basis of detected position coordinates included in the detected position data. In addition, for example, when there are a plurality of pieces of detected position data including a touch flag indicating that the front touch sensor 30*a* was touched, the detected position data being associated with reception dates and times after a point in time that a plurality of options were displayed on the touch panel 34, the processing executing section 54 may highlight an option disposed at a position identified on the basis of detected position coordinates included in the detected position data associated with a latest reception date and time, for example, from among the pieces of detected position data including the touch flag indicating that the front touch sensor 30*a* was touched.

In addition, for example, when the processing executing section 54 has stopped processing according to detected position data received by the detection result receiving section 50, and has changed from conditions in which the processing executing section 54 performs the processing according to the detected position data received by the detection result receiving section 50 to conditions in which the processing executing section 54 performs processing according to an operating signal received by the operating input receiving section 52, the priority control section 56 may determine, at predetermined time intervals, whether or not the contact on the touch sensor 30 where a valid contact operation was performed when the change was made is ended (whether or not detected position data including detected position coordinates having Null values is received from the touch sensor 30). Then, after it is determined that the contact on the touch sensor 30 where the valid contact operation was performed when the change was made is ended, the determination of whether or not a valid contact operation is performed on one of the touch sensors 30 may be started as described above.

In addition, alternatively, for example, when the processing executing section 54 has stopped processing according to detected position data received by the detection result receiving section 50, and has changed from conditions in which the processing executing section 54 performs the processing according to the detected position data received by the detection result receiving section 50 to conditions in which the processing executing section 54 performs processing according to an operating signal received by the operating input receiving section 52, the priority control section 56 may determine, at predetermined time intervals, whether or not conditions in which no valid contact operation is performed on either of the touch sensors 30 have occurred after the change was made. Then, after conditions in which no valid contact operation is performed on either of the touch sensors 30 have occurred, the determination of whether or not a valid contact operation is performed on one of the touch sensors 30 may be started as described above.

Thus, for example, when the information processing device 10 has received an operating signal of an operating key 32 such as a direction key 36 or the like in a state in which a finger or the like is in contact with the touch panel 34 but the finger or the like is not separated from the touch panel 34, so that the processing executing section 54 is not performing processing according to a tap operation, and processing has been started to be performed which successively updates the system setting menu image 60 displayed on the touch panel 34 such that a setting item image 62 enclosed by the highlighting image 68 is sequentially changed to a next setting item image 62 disposed in a downward direction with the passage of time, the processing of sequentially changing the setting item image 62 enclosed by the highlighting image 68 to a setting item image 62 below is continued even when a tap operation on the touch panel 34 is performed by another finger or the like while the state in which the finger or the like is not separated from the touch panel 34 is maintained. Thus, when an operating input to the touch sensor 30 which operating input has been performed since before a start of performance of processing according to an operating signal received by the operating input receiving section 52 is continued during the performance of the processing according to the operating signal received by the operating input receiving section 52, the processing executing section 54 may continue the processing according to the operating signal received by the operating input receiving section 52 even when another operating input to the touch sensor 30 is received.

In addition, for example, when the processing executing section 54 has stopped processing according to an operating signal received by the operating input receiving section 52, and has changed from conditions in which the processing executing section 54 performs the processing according to the operating signal received by the operating input receiving section 52 to conditions in which the processing executing section 54 performs processing according to detected position data received by the detection result receiving section 50, the priority control section 56 may determine, at predetermined time intervals, whether or not a valid operation on the operating key 32 where the valid operation was performed when the change was made is ended. Then, after it is determined that the valid operation on the operating key 32 where the valid operation was performed when the change was made is ended, the determination of whether or not a valid operation is performed on one of the operating keys 32 may be started as described above.

In addition, alternatively, for example, when the processing executing section 54 has stopped processing according to an operating signal received by the operating input receiving section 52, and has changed from conditions in which the processing executing section 54 performs the processing according to the operating signal received by the operating input receiving section 52 to conditions in which the processing executing section 54 performs processing according to detected position data received by the detection result receiving section 50, the priority control section 56 may determine, at predetermined time intervals, whether or not conditions in which no valid operation is performed on either of the operating keys 32 have occurred after the change was made. Then, after conditions in which no valid operation is performed on either of the operating keys 32 have occurred, the determination of whether or not a valid contact operation is performed on one of the touch sensors 30 may be started as described above.

Thus, for example, in a case where the contact of a finger or the like with a setting item image 62 is detected while a state in which the downward direction key 36D is depressed is continued, and thereafter a valid operation on an operating key 32 other than the downward direction key 36D is received while the state in which the downward direction key 36D is depressed is maintained, processing according to the setting item image 62 with which the finger or the like has been in contact is performed when the finger or the like is thereafter separated from the touch panel 34. Thus, when an operating input to an operating key 32 which operating input has been performed since before a start of performance of processing according to detected position data received by the detection result receiving section 50 is continued during the performance of the processing according to the detected position data received by the detection result receiving section 50, the processing executing section 54 may continue the processing according to the detected position data received by the detection result receiving section 50 even when an operating input to another operating key 32 is received.

In addition, for example, the direction keys 36, the front surface buttons 38, and the upper side surface buttons 40 may be formed as a pressure sensitive button to output a digital value (for example an integer of any one of 0 to 255) according to a pressing force to the information processing device 10. For example, a value 0 may be output when the pressure sensitive button is not depressed at all, and a value 255 may be output when the pressure sensitive button is depressed to a maximum. Then, the information processing device 10 may treat the digital value according to the pressing force as a value of depression data. For example, the priority control section 56 may determine an operating key 32 whose value of depression data received by the operating input receiving section 52 is a predetermined value or more (for example 128 or more) as an operating key 32 on which a valid operation has been performed.

In addition, in the information processing device 10 according to the present embodiment, an operation when an operating input to the front touch sensor 30*a* is received may be different from an operation when an operating input to the rear touch sensor 30*b* is received. For example, during the performance of processing according to an operating input to an operating key 32, when an operating input to the front touch sensor 30*a* is received, the processing executing section 54 may stop processing according to the operating input to the operating key 32, and start to perform processing according to the operating input to the front touch sensor 30*a*, and when an operating input to the rear touch sensor 30*b* is received, the processing executing section 54 may continue the processing according to the operating input to the operating key 32 without stopping the processing according to the operating input to the operating key 32.

Figure 15:
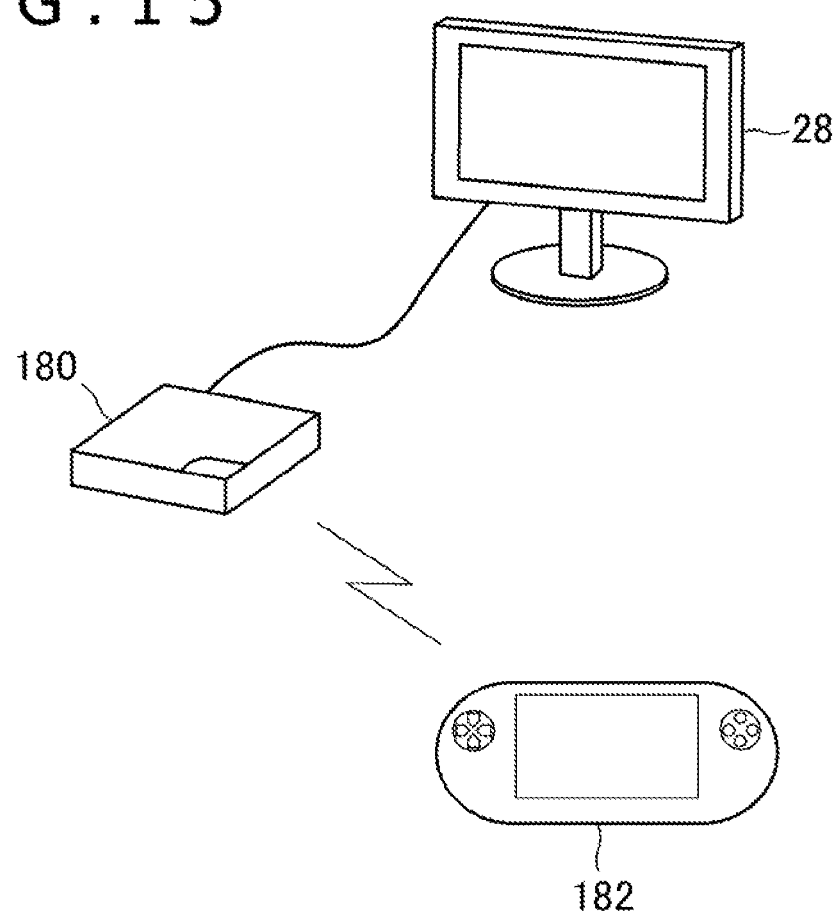
FIG. 15 is a diagram showing an example of a stationary type game device.

In addition, the present embodiment may be applied to a stationary type game device including a main body section 180 and a controller 182 as shown in FIG. 15. The main body section 180 shown in FIG. 15 includes for example a control section 20, a storage section 22, a communicating section 24, and an image processing section 26. An image generated by the main body section 180 shown in FIG. 15 is displayed on a display section 28 such as a display or the like connected to the main body section 180. In addition, the main body section 180 shown in FIG. 15 can communicate with the controller 182. The controller 182 shown in FIG. 15 includes for example a communicating section 24, touch sensors 30, and operating keys 32. The main body section 180 shown in FIG. 15 performs processing according to an operating signal corresponding to an operation on a touch sensor 30 or an operating key 32, the operating signal being received from the controller 182. In addition, positions on the touch sensor 30 included in the controller 182 and positions on the display section 28 such as a display or the like connected to the main body section 180 are associated with each other. As with the information processing device 10 described above, the main body section 180 illustrated in FIG. 15 performs processing according to an operating input to one of a touch sensor 30 or an operating key 32 provided to the controller 182. In addition, as with the information processing device 10 described above, the main body section 180 illustrated in FIG. 15 has options displayed on the display section 28. When an operating input to an operating key 32 associated with highlighting is received while there is no highlighted option, the main body section 180 may highlight an option disposed at a position identified on the basis of a history of detection of positions on the touch sensor 30 (for example an option disposed at a position closest from a position on the display section 28 which position is associated with a detected position on the touch sensor 30 as described above or the like). When an operating input to an operating key 32 associated with the performance of processing according to a highlighted option is received while the highlighted option is present, the main body section 180 may perform processing according to the highlighted option.

In addition, the above concrete character strings and numerical values and the concrete character strings in the drawings are illustrative, and are not limited to these character strings and numerical values.

The invention claimed is:

1. An information processing device comprising:

a touch sensor;

an operating section keyboard, which is different from the touch sensor; and a processing executing section performing processing according to first operating inputs to the touch sensor and second operating inputs to the operating section keyboard, wherein when the first operating inputs to the touch sensor and the second operating inputs to the operating section keyboard are received simultaneously, the processing executing section performs processing according to one of the first and second operating inputs identified by a priority control setting, wherein when the priority control setting identifies the first operating inputs to the touch sensor, the processing executing section performs processing of the first operating inputs to the touch sensor on a priority basis as compared to the second operating inputs to the operating section keyboard, such that the second operating inputs to the operating section keyboard will be ignored unless the second operating inputs provide a predetermined valid operation to the operating section keyboard, in which case the processing executing section switches processing from the first operating inputs to the second operating inputs, wherein when the priority control setting identifies the second operating inputs to the operating section keyboard, the processing executing section performs processing of the second operating inputs to the operating section keyboard on a priority basis as compared to the first operating inputs to the touch sensor, such that the first operating inputs to the touch sensor will be ignored unless the first operating inputs provide another predetermined valid operation to the touch sensor, in which case the processing executing section reverses the switch of processing from the second operating inputs to the first operating inputs, wherein when the processing executing section is performing processing according to a constantly input one of the first and second operating inputs, and during such processing the other of the first and second operating inputs is received even as the one of the first and second operating inputs remains constant, the processing executing section switches processing from the one to the other of the first and second operating inputs, and wherein when scrolling through a content item list in response to the second operating inputs to the operating section keyboard: (i) the processing executing section does not switch processing from the second operating inputs to the first operating inputs and continues to process the scrolling through the content item list in response to the second operating inputs to the operating section keyboard, even when simultaneously receiving a constant contact input as the first operating input to the touch sensor; and (ii) the processing executing section does not switch processing from the second operating inputs to the first operating inputs and continues to process the scrolling through the content item list in response to the second operating inputs to the operating section keyboard, even when the simultaneously received constant contact input transitions therefrom to a lift off, non-contact input as the first operating input to the touch sensor.

2. The information processing device of claim 1, wherein when the second operating inputs to the operating section keyboard are received, the processing executing section performs processing according to the first operating inputs to the touch sensor, the first operating inputs to the touch sensor being identified as an operating input associated with the second operating inputs to the operating section keyboard, on a basis of data associating the second operating inputs to the operating section keyboard with the first operating inputs to the touch sensor.

3. An information processing method comprising:

receiving an operating input to a touch sensor;

receiving an operating input to an operating section keyboard, which is different from the touch sensor; and performing processing according to first operating input to the touch sensor and second operating input to the operating section keyboard, wherein when the first operating inputs to the touch sensor and the second operating inputs to the operating section keyboard are received simultaneously, processing according to one of the first and second operating inputs identified by a priority control setting, wherein when the priority control setting identifies the first operating inputs to the touch sensor, the performing includes processing of the first operating inputs to the touch sensor on a priority basis as compared to the second operating inputs to the operating section keyboard, such that the second operating inputs to the operating section keyboard will be ignored unless the second operating inputs provide a predetermined valid operation to the operating section keyboard, in which case the processing switches processing from the first operating inputs to the second operating inputs, wherein when the priority control setting identifies the second operating inputs to the operating section keyboard, the performing includes processing of the second operating inputs to the operating section keyboard on a priority basis as compared to the first operating inputs to the touch sensor, such that the first operating inputs to the touch sensor will be ignored unless the first operating inputs provide another predetermined valid operation to the touch sensor, in which case the processing reverses the switch of processing from the second operating inputs to the first operating inputs, wherein when the processing executing section is performing processing according to a constantly input one of the first and second operating inputs, and during such processing the other of the first and second operating inputs is received even as the one of the first and second operating inputs remains constant, the processing executing section switches processing from the one to the other of the first and second operating inputs, and wherein when scrolling through a content item list in response to the second operating inputs to the operating section keyboard: (i) the processing executing section does not switch processing from the second operating inputs to the first operating inputs and continues to process the scrolling through the content item list in response to the second operating inputs to the operating section keyboard, even when simultaneously receiving a constant contact input as the first operating input to the touch sensor; and (ii) the processing executing section does not switch processing from the second operating inputs to the first operating inputs and continues to process the scrolling through the content item list in response to the second operating inputs to the operating section keyboard, even when the simultaneously received constant contact input transitions therefrom to a lift off, non-contact input as the first operating input to the touch sensor.

4. The information processing method of claim 3, wherein when the second operating inputs to the operating section keyboard are received, the processing executing section performs processing according to the first operating inputs to the touch sensor, the first operating inputs to the touch sensor being identified as an operating input associated with the second operating inputs to the operating section keyboard, on a basis of data associating the second operating inputs to the operating section keyboard with the first operating inputs to the touch sensor.

5. A non-transitory, computer readable storage medium containing a program for a computer, which when executed causes the computer to carry out actions, comprising:

receiving operating inputs to a touch sensor and an operating section keyboard, which is different from the touch sensor; and performing processing according to first operating input to the touch sensor and second operating input to the operating section keyboard, wherein when the first operating inputs to the touch sensor and the second operating inputs to the operating section keyboard are received simultaneously, processing according to one of the first and second operating inputs identified by a priority control setting, wherein when the priority control setting identifies the first operating inputs to the touch sensor, the performing includes processing of the first operating inputs to the touch sensor on a priority basis as compared to the second operating inputs to the operating section keyboard, such that the second operating inputs to the operating section keyboard will be ignored unless the second operating inputs provide a predetermined valid operation to the operating section keyboard, in which case the processing switches processing from the first operating inputs to the second operating inputs, wherein when the priority control setting identifies the second operating inputs to the operating section keyboard, the performing includes processing of the second operating inputs to the operating section keyboard on a priority basis as compared to the first operating inputs to the touch sensor, such that the first operating inputs to the touch sensor will be ignored unless the first operating inputs provide another predetermined valid operation to the touch sensor, in which case the processing reverses the switch of processing from the second operating inputs to the first operating inputs, wherein when the processing executing section is performing processing according to a constantly input one of the first and second operating inputs, and during such processing the other of the first and second operating inputs is received even as the one of the first and second operating inputs remains constant, the processing executing section switches processing from the one to the other of the first and second operating inputs, and wherein when scrolling through a content item list in response to the second operating inputs to the operating section keyboard: (i) the processing executing section does not switch processing from the second operating inputs to the first operating inputs and continues to process the scrolling through the content item list in response to the second operating inputs to the operating section keyboard, even when simultaneously receiving a constant contact input as the first operating input to the touch sensor; and (ii) the processing executing section does not switch processing from the second operating inputs to the first operating inputs and continues to process the scrolling through the content item list in response to the second operating inputs to the operating section keyboard, even when the simultaneously received constant contact input transitions therefrom to a lift off, non-contact input as the first operating input to the touch sensor.

6. The non-transitory, computer readable storage medium of claim 5, wherein when the second operating inputs to the operating section keyboard are received, the processing executing section performs processing according to the first operating inputs to the touch sensor, the first operating inputs to the touch sensor being identified as an operating input associated with the second operating inputs to the operating section keyboard, on a basis of data associating the second operating inputs to the operating section keyboard with the first operating inputs to the touch sensor.

* * * * *